United States Patent
Enomoto et al.

(10) Patent No.: US 11,207,773 B2
(45) Date of Patent: Dec. 28, 2021

(54) ACTION TRANSFER DEVICE, ACTION TRANSFER METHOD, AND NON-TRANSITORY COMPUTER-READABLE MEDIUM STORING ACTION TRANSFER PROGRAM

(71) Applicant: SOINN Inc., Tokyo (JP)

(72) Inventors: Shohei Enomoto, Tokyo (JP); Osamu Hasegawa, Tokyo (JP)

(73) Assignee: SOINN INC., Tokyo (JP)

( * ) Notice: Subject to any disclaimer, the term of this patent is extended or adjusted under 35 U.S.C. 154(b) by 304 days.

(21) Appl. No.: 16/347,745

(22) PCT Filed: Nov. 1, 2017

(86) PCT No.: PCT/JP2017/039468
§ 371 (c)(1),
(2) Date: May 6, 2019

(87) PCT Pub. No.: WO2018/084164
PCT Pub. Date: May 11, 2018

(65) Prior Publication Data
US 2019/0283246 A1    Sep. 19, 2019

(30) Foreign Application Priority Data
Nov. 7, 2016 (JP) .............................. JP2016-217353

(51) Int. Cl.
*B25J 9/16* (2006.01)
*G06N 3/04* (2006.01)

(52) U.S. Cl.
CPC ................. *B25J 9/163* (2013.01); *B25J 9/16* (2013.01); *B25J 9/161* (2013.01); *B25J 9/1605* (2013.01);
(Continued)

(58) Field of Classification Search
CPC combination set(s) only.
See application file for complete search history.

(56) References Cited

U.S. PATENT DOCUMENTS 5,566,275 A    10/1996 Kano
8,525,836 B1 *  9/2013 Poursohi ................. H04L 67/10
                                                    345/428
(Continued)

FOREIGN PATENT DOCUMENTS

JP    H06242802 A    9/1994
JP    2002160185 A   6/2002
(Continued)

OTHER PUBLICATIONS

Shepard, D., "A two-dimensional interpolation function for irregularly-spaced data," Proceedings of the 1968 ACM National Conference, Aug. 27, 1968, New York, USA, 8 pages.
(Continued)

*Primary Examiner* — Adam R Mott
*Assistant Examiner* — Arslan Azhar
(74) *Attorney, Agent, or Firm* — McCoy Russell LLP

(57) ABSTRACT

A transfer source action information acquisition unit acquires first action information of the transfer source robot. A transfer destination action information acquisition unit acquires second action information of the transfer destination robot. A correction unit corrects the action information of the transfer source robot by using the second action information and in accordance with a predetermined update formula and thereby generates third action information of the transfer destination robot. The pieces of the second action information of the transfer destination robot are less than the pieces of the first action information of the transfer source robot. The first to third action information includes a set of data indicative of one or more robot joint values and (Continued)

a set of data indicative of a coordinate value of a robot specific part.

6 Claims, 20 Drawing Sheets

(52) U.S. Cl.
CPC .......... *B25J 9/1653* (2013.01); *B25J 9/1692* (2013.01); *G06N 3/0481* (2013.01); *G05B 2219/33029* (2013.01); *G05B 2219/33045* (2013.01); *G05B 2219/39296* (2013.01)

(56) References Cited

U.S. PATENT DOCUMENTS

| | | | |
|---|---|---|---|
| 2015/0213417 A1* | 7/2015 | Kuffner, Jr. ............ | G08B 21/18 705/305 |
| 2016/0023351 A1* | 1/2016 | Kuffner ................. | B25J 9/0084 700/248 |
| 2016/0243704 A1* | 8/2016 | Vakanski ............... | B25J 9/1697 |
| 2017/0326727 A1 | 11/2017 | Kimura et al. | |
| 2018/0056505 A1* | 3/2018 | Kuffner ................. | B25J 9/0084 |
| 2018/0247463 A1* | 8/2018 | Rekimoto ............. | H04N 13/00 |

FOREIGN PATENT DOCUMENTS

| | | |
|---|---|---|
| JP | 2004322224 A | 11/2004 |
| JP | 2016107346 A | 6/2016 |
| JP | 6242802 B2 | 11/2017 |
| WO | 2016088367 A1 | 6/2016 |

OTHER PUBLICATIONS

Kohonen, T., "Self-Organized Formation of Topologically Correct Feature Maps," Biological Cybernetics, vol. 43, No. 1, Jan. 1982, 11 pages.

Furao, S. et al., "A fast nearest neighbor classifier based on self-organizing incremental neural network," Neural Networks, vol. 21, No. 10, Dec. 2008, Available Online Jul. 6, 2008, 11 pages.

Bocsi, B. et al., "Alignment-based Transfer Learning for Robot Models," Proceedings of the 2013 International Joint Conference on Neural Networks (IJCNN), Aug. 4, 2013, Dallas, Texas, 7 pages.

ISA Japan Patent Office, International Search Report Issued in Application No. PCT/JP2017/039468, dated Feb. 20, 2018, WIPO, 3 pages.

European Patent Office, Office Action Issued in Application No. 17866909.9, dated Jun. 1, 2021, Netherlands, 11 pages.

* cited by examiner $D_{src} \leftarrow \langle J_{src}, X_{src} \rangle$ : the large dataset generated by source robot, $D_{tgt} \leftarrow \langle J_{tgt}, X_{tgt} \rangle$ : the small dataset generated by target robot, $num(A)$ : number of elements of a set A, $sgm(a, x)$ : sigmoid function ($a$:gain, $x$:value), $a_e$ : parameter of $a$, $e$ : threshold 1: $t \leftarrow 1$ 2: $X_{src} \leftarrow X_{src} / \max(|X_{src}|)$ 3: $X_{tgt} \leftarrow X_{tgt} / \max(|X_{tgt}|)$ 4: $D_{trans} \leftarrow X_{src}$ 5: $\Delta X \leftarrow \{\Delta x \mid \Delta x = x_{tgt} - x_{pair}, \langle \vec{j}_{tgt}, \vec{x}_{tgt} \rangle \in D_{tgt}, \langle \vec{j}_{tgt}, \vec{x}_{tgt} \rangle \in D_{trans}\}$ 6: $\Delta x \leftarrow$ elements of $\max(|\Delta X|)$ 7: while $|\Delta x| > e$ do

8: $\quad a \leftarrow (1 + t / num(D_{tgt})) a_e / \Delta x$

9: $\quad$ for all $\langle \vec{j}_{tgt}, \vec{x}_{tgt} \rangle \in D_{trans}$ do

10: $\quad\quad d_j \leftarrow \|\vec{j}_{tgt} - \vec{j}_i\|^2$

11: $\quad\quad d_j \leftarrow d_j / \max(d_j)$

12: $\quad\quad \vec{x}_i \leftarrow \vec{x}_i + 2sgm(a, -d_j)\Delta x$

13: $\quad$ end for

14: $\quad \Delta X \leftarrow \{\Delta x \mid \Delta x = x_{tgt} - x_{pair}, \langle \vec{j}_{tgt}, \vec{x}_{tgt} \rangle \in D_{tgt}, \langle \vec{j}_{tgt}, \vec{x}_{tgt} \rangle \in D_{trans}\}$ 15: $\quad \Delta x \leftarrow$ elements of $\max(|\Delta X|)$ 16: $\quad t \leftarrow t + 1$ 17: end while

18: $X_{trans} \leftarrow \max(|\Delta X_{tgt}| X_{trans})$

Fig. 3

TRANSFER SOURCE ROBOT
(SIMULATOR, ETC.)
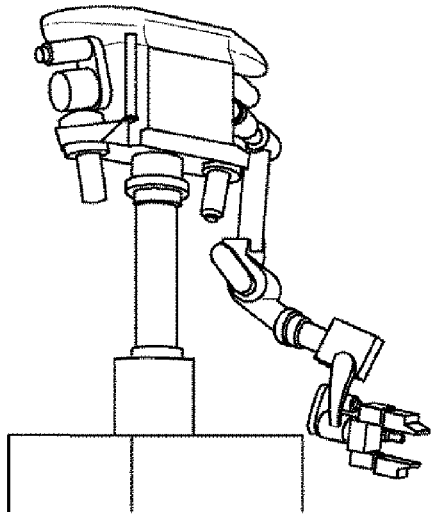
TRANSFER DESTINATION ROBOT
(REAL ROBOT)
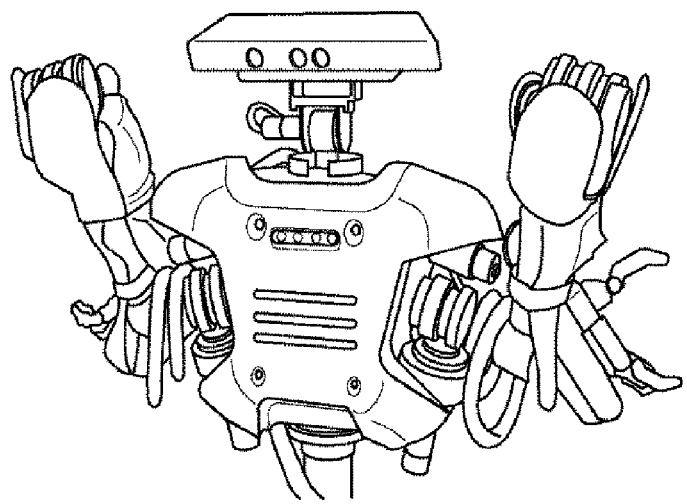
LARGE AMOUNT OF ACTION INFORMATION 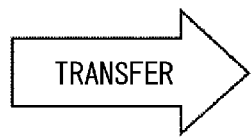 TRANSFER → ACTION INFORMATION HELD BY ANOTHER ROBOT CAN BE IMPLEMENTED BY A SMALL NUMBER OF TRIALS
Fig. 20

ACTION TRANSFER DEVICE, ACTION TRANSFER METHOD, AND NON-TRANSITORY COMPUTER-READABLE MEDIUM STORING ACTION TRANSFER PROGRAM

CROSS REFERENCE TO RELATED APPLICATIONS

The present application is a U.S. National Phase of International Patent Application Serial No. PCT/JP2017/039468 entitled "ACTION TRANSFER DEVICE, ACTION TRANSFER METHOD, AND NON-TEMPORARY COMPUTER READABLE MEDIUM HAVING ACTION TRANSFER PROGRAM STORED THEREON," filed on Nov. 1, 2017. International Patent Application Serial No. PCT/JP2017/039468 claims priority to Japanese Patent Application No. 2016-217353, filed on Nov. 7, 2016. The entire contents of each of the above-mentioned applications are hereby incorporated by reference in their entirety for all purposes.

TECHNICAL FIELD

The present invention relates to an action transfer device, an action transfer method, and an action transfer program. For example, the present invention relates to a technique for transferring an action from a transfer source robot by using a small number of learning samples acquired by a transfer destination robot.

BACKGROUND ART

Currently, the use of robots has been expanding in human society including in the home. At present, an intellectual development mechanism for robots is still being developed, and thus actions that can be executed by robots and things that can be understood by robots are limited. On the other hand, various types of robots having different body characteristics have been developed. Assuming that such robots having the above limitations are introduced into the standard home, it would be inefficient to cause each of these robots to learn actions and the like independently.

Accordingly, there is a need for a method for sharing the knowledge learned by each robot, in particular, action information, among other robots. The technique for obtaining an action by sharing action information among robots is referred to as "action transfer". In other words, the action transfer is a technique in which a transfer destination (target domain) robot efficiently learns an action by using action information obtained by a transfer source (source domain) robot.

Information (action information) based on which a robot acts can be considered as, for example, being information obtained by accumulating correspondence relations between a joint angle (joint value) and coordinates (end effector) of a leading end of an arm of a robot having certain physical properties (e.g., the length of an arm, or the number of joints). The use of such action information enables the robot to act. Accordingly, the physical properties have an important effect on the robot action transfer. However, it is generally difficult to unify the physical properties of a robot among various types of robots. Therefore, a process for adapting action information obtained from another robot to the physical properties of the robot is important in the action transfer.

As the above method, a technique in which physical properties of a transfer destination robot are obtained and then action information about a transfer destination robot is processed to be adapted to the physical properties of the transfer source robot is generally employed. However, in this technique, some advance preparation such as measurement of physical properties of the transfer destination robot is required. Further, if the physical properties of the transfer destination robot are changed, or if an error occurs in the measurement thereof, it is difficult to perform an action accurately. Furthermore, humans and animals can learn actions without obtaining information about their own physical properties in advance. Accordingly, it seems to be a more realistic approach to achieve an action transfer based on experiences of a real robot, without obtaining information about the physical properties of the transfer destination robot in advance.

In this regard, Non Patent Literature 1 proposes a technique for transferring action samples of a transfer source robot to a transfer destination robot by using the respective numbers of action samples acquired from both the transfer source robot and the transfer destination robot that are the same as each other even when some of the physical properties of the transfer destination robot are unknown. Note that in this case, the action transfer is achieved by fitting using a matrix calculation.

CITATION LIST

Non Patent Literature

Non Patent Literature 1: Botond Bocsi, and two others, "Alignment-based Transfer Learning for Robot Models", [online], 2013, [searched on Oct. 6, 2014], URL: http://www.cs.ubbcluj.ro/~bboti/pubs/ijcnn_2013.pdf

SUMMARY OF INVENTION

Technical Problem

However, Non Patent Literature 1 fails to describe details regarding the number of data samples required for the action transfer. It is considered that it is necessary to acquire the respective numbers of action samples from both the transfer source robot and the transfer destination robot that are the same as each other. Specifically, the technique needs to acquire a large number of learning samples not only in the transfer source but also in the transfer destination. This causes a problem that it takes a large amount of time for the technique to perform action transfer, it takes a large number of man-hours, cost, and the like, and it is difficult to achieve the action transfer rapidly and accurately.

In general, the use of a real robot on a simulator or in an experiment facility, or the like as a transfer source robot makes it relatively easy to acquire a large number of action samples. However, it is assumed that the transfer destination robot is a real robot provided for an actual operation at home or the like. Under such a situation, it is considered that it is difficult to acquire a number of learning samples the same as that of the transfer source robot. Accordingly, in the transfer destination robot, a method for achieving the action transfer with high efficiency without the step of acquiring a large number of learning samples is required.

The present invention has been made to solve the above-mentioned problems, and an object of the present invention is to implement an action transfer from a transfer source robot by using a small number of learning samples acquired by a transfer destination robot.

Solution to Problem

An action transfer device which is a first aspect of the present invention includes a transfer source action information acquisition unit configured to acquire first action information including data indicative of a plurality of actions of a transfer source robot; a transfer destination action information acquisition unit configured to acquire second action information including data indicative of a plurality of actions of a transfer destination robot; and a correction unit configured to correct the first action information by using the second action information and in accordance with a predetermined update formula and thereby generate third action information for transferring the actions of the transfer source robot to the transfer destination robot. The number of pieces of data included in the second action information is smaller than the number of pieces of data included in the first action information and the first to third action information includes a set of data indicative of one or more robot joint values and a set of data indicative of a coordinate value of a robot specific part. The correction unit is configured to retrieve the same joint value as a joint value included in the second action information from among the joint values included in the first action information; calculate an error between a coordinate value included in the first action information and corresponding to the retrieved joint value and a coordinate value included in the second action information; select a maximum error which is a maximum value from the calculated errors of the coordinate values; select a joint value included in the second action information and corresponding to the maximum error; and propagate the maximum error to each of the coordinate values included in the first action information by using the update formula including as a parameter an error between the joint values each corresponding to one of the coordinate values included in the first action information and a joint value corresponding to the maximum error, and generate the third action information.

An action transfer device which is a second aspect of the present invention is the above-described action transfer device in which the correction unit is preferably configured to repeatedly perform propagation of the error using the update formula until the maximum error becomes smaller than a preset threshold.

An action transfer device which is a third aspect of the present invention is the above-described action transfer device in which the update formula is preferably expressed as $x=x+2\,sgm(a,d)\times\Delta x$, where X is the coordinate value, $\Delta x$ is the maximum error, $sgm(a,d)$ is a Sigmoid function of a gain a and a variable d, and d is the error of the joint values that is included as the parameter in the update formula.

An action transfer device which is a fourth aspect of the present invention is preferably the above-described action transfer device in which the coordinate value included in the first action information is a value obtained by dividing a plurality of coordinate values obtained by causing the transfer source robot to operate by a maximum value among the plurality of coordinate values, the coordinate value included in the second action information is a value obtained by dividing a plurality of coordinate values obtained by causing the transfer destination robot to operate by a maximum value among the plurality of coordinate values, and the parameter d of the update formula is a value obtained by dividing the error between the joint values each corresponding to one of the coordinate values included in the first action information and the joint value corresponding to the maximum error by a maximum value among the errors.

An action transfer method which is a fifth aspect of the present invention includes acquiring first action information including data indicative of a plurality of actions of a transfer source robot; acquiring second action information including data indicative of a plurality of actions of a transfer destination robot; correcting the first action information by using the second action information and in accordance with a predetermined update formula and thereby generating third action information for transferring the actions of the transfer source robot to the transfer destination robot, wherein the number of pieces of data included in the second action information is smaller than the number of pieces of data included in the first action information, and the first to third action information includes a set of data indicative of one or more robot joint values and a set of data indicative of a coordinate value of a robot specific part; retrieving the same joint value as a joint value included in the second action information from among the joint values included in the first action information; calculating an error between a coordinate value included in the first action information and corresponding to the retrieved joint value and a coordinate value included in the second action information; selecting a maximum error which is a maximum value from the calculated errors of the coordinate values; selecting a joint value included in the second action information and corresponding to the maximum error; propagating the maximum error to each of the coordinate values included in the first action information by using the update formula including as a parameter an error between the joint values each corresponding to one of the coordinate values included in the first action information and a joint value corresponding to the maximum error and generating the third action information.

An action transfer program which is a sixth aspect of the present invention causes a computer to execute: a process of acquiring first action information including data indicative of a plurality of actions of a transfer source robot; a process of acquiring second action information including data indicative of a plurality of actions of a transfer destination robot; and a process of correcting the first action information by using the second action information and in accordance with a predetermined update formula and thereby generating third action information for transferring the actions of the transfer source robot to the transfer destination robot. The number of pieces of data included in the second action information is smaller than the number of pieces of data included in the first action information, and the first to third action information includes a set of data indicative of one or more robot joint values and a set of data indicative of a coordinate value of a robot specific part. The process of generating the third action information includes: retrieving the same joint value as a joint value included in the second action information from among the joint values included in the first action information; calculating an error between a coordinate value included in the first action information and corresponding to the retrieved joint value and a coordinate value included in the second action information; selecting a maximum error which is a maximum value from the calculated errors of the coordinate values; selecting a joint value included in the second action information and corresponding to the maximum error; and propagating the maximum error to each of the coordinate values included in the first action information by using the update formula including as a parameter an error between the joint values each corresponding to one of the coordinate values included in the first action information and a joint value corresponding to the maximum error and generating the third action information.

Advantageous Effect of Invention

According to the present invention, it is made possible to implement an action transfer from a transfer source robot by using a small number of learning samples acquired by a transfer destination robot.

BRIEF DESCRIPTION OF THE DRAWINGS

FIG. 3 is a diagram illustrating an example of an operation algorithm of the action transfer device according to the first embodiment.

FIG. 20 is a diagram illustrating the concept of action transfer in accordance with the present invention.

DESCRIPTION OF EMBODIMENTS

Figure 1:
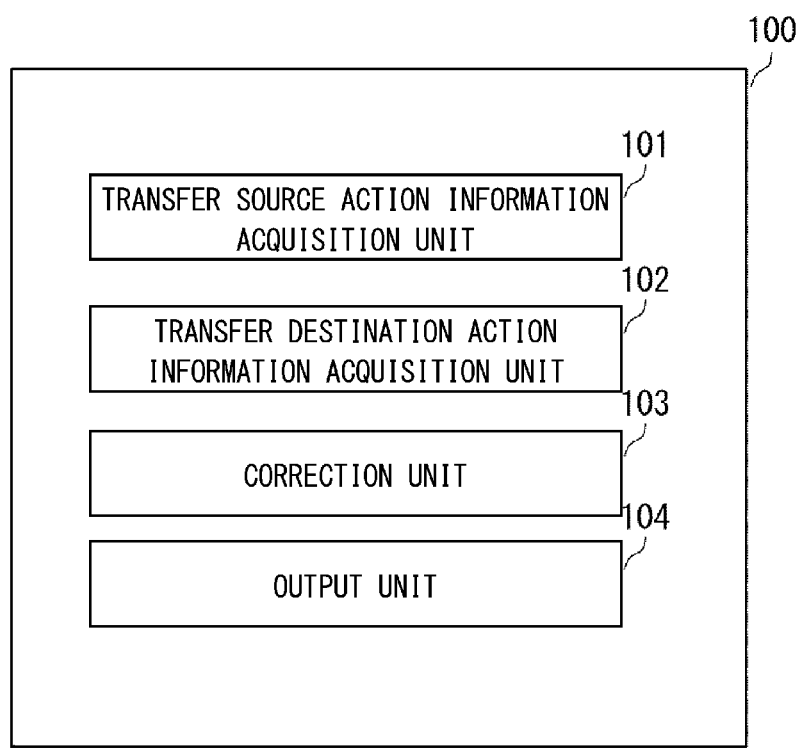
FIG. 1 is a block diagram schematically illustrating a configuration of an action transfer device according to a first embodiment.

First, various conditions constituting the premise of an action transfer according to the present invention will be described. The present invention proposes a technique for implementing an action transfer between robots under the following conditions (FIG. 20). Embodiments of the present invention described below are also implemented under the following conditions. It should be noted that the action of the robot as used herein refers to moving a specific part of the robot, such as an end effector of an arm (a tip end of an arm which corresponds to a finger of a human) to any intended location (coordinate value).

Condition 1: The number of joints of a transfer source robot and the number of joints of a transfer destination robot are known and equal to each other.

Condition 2: Physical properties (e.g., the length of the arm) other than the number of joints are unknown.

Condition 3: A large number of action samples can be extracted from the transfer source robot. The transfer source robot is typically a robot that is present on a simulator or in an experiment facility.

Condition 4: Only a small number of action samples can be extracted from the transfer destination robot. The transfer destination robot is typically a real robot The action transfer technique according to the present invention transfers an action from a transfer source robot satisfying the above-described conditions to a transfer destination robot. The action transfer as used herein refers to creating transfer data Dtrans which is an experience database that is adapted to the work space for the transfer destination robot from a transfer source data set Dsrc which is an experience database of actions created on the transfer source robot. At this point, the transfer data Dtrans is created by first causing the transfer destination robot to perform a small number of actions to create a transfer destination sample data set Dtgt and then correcting the transfer source data set Dsrc using the transfer destination sample data set Dtgt. Here, the size of the transfer destination sample data set Dtgt is smaller than the transfer source data set Dsrc and the size of the transfer data Dtrans is the same as or equivalent to the size of the transfer source data set Dsrc.

Thus, according to this technique, learning (i.e., action transfer) can be achieved using a smaller number of pieces of data sets than in a case where data sets are generated by causing the transfer destination robot to actually perform a large number of actions. Also, the accuracy of the action transfer is improved as compared to a case where the transfer source data set Dsrc is copied on an as-is basis to generate the transfer data Dtrans.

It should be noted that the experience database such as the transfer source data set Dsrc may be a simple set of pairs of joint values and coordinate values. In addition to a simple database (a database recording information about a simple set of pairs of joint values and coordinate values), the experience database such as the transfer source data set Dsrc may be, for example, a database obtained by compressing information using SOM (Self Organizing Maps) by competitive learning, SOINN (Self Organizing Incremental Neural Network) which is a technique for online unsupervised learning capable of additional learning by modifying the SOM, or the like. It should be noted that the SOM and the SOINN are described in the following Reference 1 and Reference 2, and thus detailed descriptions thereof are omitted.

(Reference 1) Kohonen T., "Self-organized formation of topologically correct feature maps," Biological Cybernetics Vol. 43, pp. 59-69, 1982

(Reference 2) Shen F., Hasegawa O., "A Fast Nearest Neighbor Classifier Based on Self-organizing Incremental Neural Network" Neural Networks, 2008

A method for creating an experience database D for actions on robots will now be described. This method can be applied to the creation of the transfer source data set Dsrc and the transfer destination sample data set Dtgt. In general, when the physical properties of robots are known, the use of a well-known technique of inverse kinematics (IK) makes it possible to control the end effector of the arm to be moved to any intended location. However, the physical properties are unknown in the current assumption. Accordingly, in the technique according to the present invention, IK based on experiences is carried out to thereby move the end effector. Data to be acquired by the robot so as to execute the IK based on experiences and a method for executing the IK using the data are disclosed below.

First, the joint value set J which is data indicating joint angles of all joints of the target robot is generated. The joint value set J can be expressed as follows. Here, "i" is an integer from 1 to n (where n is an integer of at least 2 or greater), which is an index indicative of the attitude of the robot whose joint values have been sampled.

$$J = \{\vec{j}_1, \vec{j}_2, \ldots, \vec{j}_n\} \quad (1)$$

It should be noted that the joint value $$\vec{j}_i \quad (2)$$

which is a component of the joint value set J is a vector quantity consisting of components for the number of joints, and for example, in the case of an m-axis robot, i.e., a robot having m joints, the joint value is represented by an m-dimensional vector.

Further, the robot is caused to actually act using the joint values included in the joint value set J, and absolute coordinate values (hereinafter simply referred to as coordinate values) of the end effector of the arm are obtained by various pieces of sensor information (e.g., visual information) about the robot. When the physical properties of the robot on the simulator or the like are known, the use of forward kinetics makes it possible to reduce a time required to acquire the coordinate values. The coordinate value set X is then generated which is a data set that collects the calculated coordinate values. The coordinate value set can be expressed as follows.

$$X = \{\vec{x}_1, \vec{x}_2, \ldots, \vec{x}_n\} \quad (3)$$

It should be noted that the coordinate value $$\vec{x}_i \quad (4)$$

which is the component of the coordinate value set X is defined as a two-dimensional vector indicating the coordinates on a plane or a three-dimensional vector indicating coordinates in a three-dimensional space. Since the coordinate values of the end effector are uniquely determined from the joint values of the robot, there is a relationship of a function between the joint values and the coordinate values.

The joint value set and the coordinate values which are acquired from these experiences, or actual actions, are represented by a data set D. The data set D is expressed by the following formula.

$$D = \left\langle J, X \right\rangle \supset \left\langle \vec{j}_i, \vec{x}_i \right\rangle \quad (5)$$

First Embodiment

In the action n transfer according to the first embodiment, the transfer destination sample data set Dtgt is acquired which is a small amount of action samples in the transfer destination robot, and the coordinate value set Xsrc of the transfer source data set of the transfer source robot is corrected using the coordinate value set Xtgt of the transfer destination sample data set Dtgt and in accordance with an update formula created with reference to the SOM and thus the transfer data Dtrans is generated.

Transfer by SOM-algorithm is an algorithm conceived from the update formula with reference to the conventionally known SOM (Self Organizing Maps). The SOM indicates self-organizing maps devised by Kohonen et al. as a technique for changing a network structure (topology) according to an input. The SOM is one type of artificial neural networks and has a mechanism for modifying a topology of neurons according to an input. The SOM learning technique is competitive learning, and neurons in the vicinity of the input are updated.

On the other hand, since setting of a target problem in the conventional SOM differs from setting of a target problem in the transfer by SOM-algorithm, a new finding is added to the method of changing an update ratio in the transfer by SOM-algorithm. In the conventional SOM, a node in one space is updated and the update ratio is determined using the distance between the input and a neighboring node of the input in the space. On the other hand, the transfer by SOM-algorithm is based on the premise that two spaces, i.e., a joint value space (joint value set) and an end effector coordinate space (coordinate value set), are present. In this technique, the coordinate value space is appropriate as the space in which updating is performed depending on input data. However, as described above, since constant restrictive conditions are present between the coordinate values and the joint values, it is important to consider the distance between the joint values in the joint value space. In view of this, in this technique, the distance between the joint values in the joint value space can be reflected in the updating of the coordinate value space and the accuracy of the action transfer is increased.

A technique for obtaining transfer data Dtrans using the transfer by SOM-algorithm is specifically described below. First, a configuration of an action transfer device 100 according to the first embodiment of the present invention will be described. FIG. 1 is a block diagram that schematically illustrates the action transfer device 100 according to the first embodiment.

The action transfer device 100 is an information processing device which is typically a server computer, a personal computer (PC), or the like. The typical action transfer device 100 includes an arithmetic processing unit, a volatile or non-volatile storage device, and an input/output device. The arithmetic processing unit executes various controls based on programs stored in the storage device, thereby logically implementing each processing unit to be described later. The action transfer device 100 is not necessarily a physically single device, but instead may be implemented by distributed processing using a plurality of information processing devices. Also, the action transfer device 100 may be incorporated in, for example, the transfer destination robot, or may be separated from the transfer destination robot.

As illustrated in FIG. 1, the action transfer device 100 has a transfer source action information acquisition unit 101, a transfer destination action information acquisition unit 102, a correction unit 103, and an output unit 104.

The transfer source action information acquisition unit 101 acquires the transfer source data set Dsrc for causing the transfer source robot to act. The transfer source data set Dsrc includes the joint value set Jsrc and the coordinate value set Xsrc of the end effector (i.e., Dsrc=<Jsrc, Xsrc>). Typically, the transfer source data set Dsrc can be generated by causing the transfer source robot to act several times on the simulator and in the experiment facility or the like and acquiring a large number of pairs of the end effector and the joint value corresponding to the end effector. Assume in this embodiment that transfer source data set Dsrc is generated in advance and the transfer source action information acquisition unit 101 acquires the transfer source data set Dsrc from the input device or the storage device.

The transfer destination action information acquisition unit 102 acquires the transfer destination sample data set Dtgt obtained when the transfer destination robot is caused to perform a test action. The transfer destination sample data set Dtgt includes the joint value set Jtgt and the coordinate value set Xtgt of the end effector (i.e., Dtgt=<Jtgt, Xtgt>). Typically, the transfer destination sample data set Dtgt can be generated by causing the transfer source robot to act several times randomly and acquiring some pairs of coordinate value of the end effector and the joint value corresponding to the coordinate value. In this case, the size of the transfer destination sample data set Dtgt may be extremely smaller than the size of the transfer source data set Dsrc. In other words, the number of action trials of the transfer destination robot may be smaller than the number of action trials of the transfer source robot. Assume in this embodiment that the transfer destination sample data set Dtgt is generated in advance and the transfer destination action information acquisition unit 102 acquires the transfer destination sample data set Dtgt from the input device or the storage device.

The correction unit 103 performs processing for modifying the transfer source data set Dsrc into the transfer data Dtrans by using the transfer destination sample data set Dtgt. In this embodiment, the correction unit 103 performs modification processing using the transfer by SOM-algorithm.

The output unit 104 outputs the transfer data Dtrans which is generated by the correction unit 103 to the outside. The transfer destination robot acquires the transfer data Dtrans output by the output unit 104, and acts based thereon, thereby making it possible to acquire an action similar to that of the transfer source robot.

Figure 2:
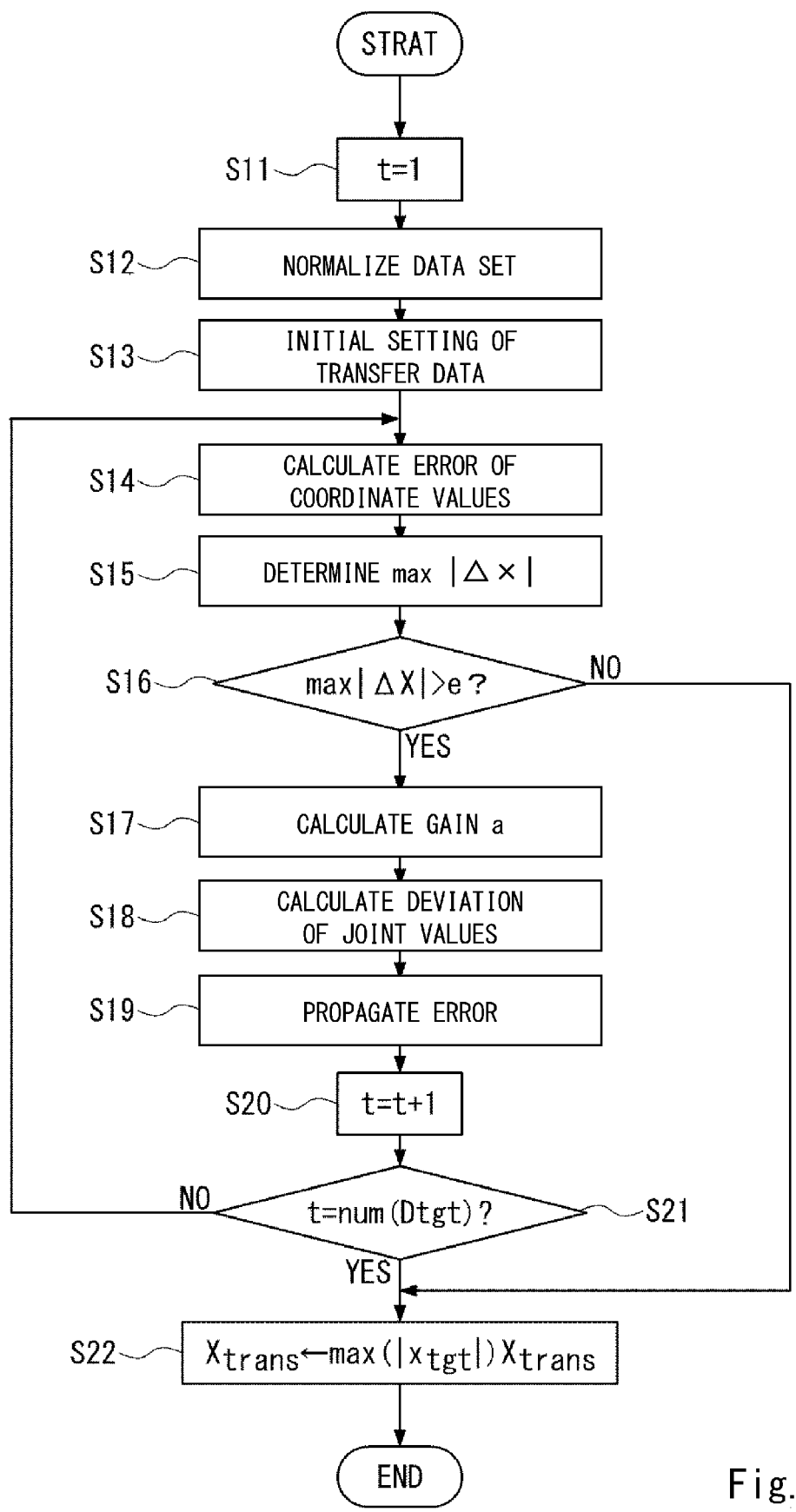
FIG. 2 is a flowchart illustrating the operation of the action transfer device according to the first embodiment. This is an example of implementation of processing as illustrated by the flowchart.

Subsequently, operation of the action transfer device 100 according to the first embodiment of the present invention will be described with reference to the flowchart of FIG. 2. It should be noted that the algorithm illustrated in FIG. 3 is an example of implementation of the processing indicated by the above-mentioned flowchart. In the algorithm of FIG. 3, "A" represents a certain set and "num (A)" represents the number of elements included in the set A. "sgm (a, x)" represents a Sigmoid function of a gain "a." "ae" is a parameter for determining the gain a. "e" indicates a threshold to which the error to be described later should conform.

Step S11: Initial Setting of the Parameter t

First, the correction unit 103 set the parameter t serving as an indicator of repeated processing to the initial value "1" (FIG. 3, the first line). In the following, an integer satisfying, for example, 1≤t≤num (Dtgt) is to be set as "t."

Step S12: Data Set Normalization

The transfer source action information acquisition unit 101 acquires the transfer source data set Dsrc. Subsequently, the transfer source action information acquisition unit 101 selects the maximum value (max |Xsrc|) from among the elements in the coordinate value set Xsrc included in the transfer source data set Dsrc and sets values obtained by dividing the respective elements in the coordinate value set Xsrc by the selected maximum value so as to define the new coordinate value set Xsrc (FIG. 3, the second line). As a result, the coordinate value set Xsrc included in the transfer source data set Dsrc is normalized.

The transfer destination action information acquisition unit 102 acquires the transfer destination sample data set Dtgt. Subsequently, the transfer destination action information acquisition unit 102 selects the maximum value (max |Xtgt|) from among the elements in the coordinate value set Xtgt included in the transfer destination sample data set Dtgt and sets values obtained by dividing the respective elements in the coordinate value set Xtgt by the selected maximum value so as to define the new coordinate value set Xtgt (FIG. 3, the third line). As a result, the coordinate value set Xtgt included in the transfer destination sample data set Dtgt is normalized.

Step S13: Initial Setting of the Transfer Data

The correction unit 103 generates the transfer data Dtrans for transferring an action from the transfer source robot to the transfer destination robot. At this point, as the initial value of the transfer data Dtrans, the same value as the transfer source data set Dsrc whose coordinate value set has been normalized in the step S12 is set as the transfer data Dtrans (FIG. 3, the fourth line).

Step S14: Calculating an Error of the Coordinate Value

The correction unit 103, for each of the joint values $$\vec{j}_{tgt} \tag{6}$$

included in the joint value set Jtgt of the transfer destination sample data set Dtgt, retrieves the joint value set Jtrans of the transfer data Dtrans for the same joint value $$\vec{j}_{pair} \tag{7}$$

Subsequently, the correction unit 103 retrieves the coordinate value set Xtrans of the transfer data Dtrans for the coordinate value $$\vec{x}_{pair} \tag{9}$$

corresponding to each joint value $$\vec{j}_{pair} \tag{8}$$

In addition, an error Δx between the coordinate value $$\vec{x}_{tgt} \tag{10}$$

corresponding to the same joint value and the coordinate value $$\vec{x}_{pair} \tag{11}$$

is calculated. This error calculation is performed for all of the joint values corresponding to the coordinate values included in the coordinate value set Xtgt of the transfer destination sample data set Dtgt and thereby an error data set ΔX having the calculated errors as its elements is generated (FIG. 3, the fifth line).

Step S15: Determining the Maximum Value of the Errors

The correction unit 103 determines the maximum value max (|ΔX|) among the error included in the error data set ΔX (FIG. 3, the sixth line).

Step S16: Evaluating the Maximum Value of the Errors

The correction unit 103 determines whether or not the maximum value max (|ΔX|) is equal to or greater than a predetermined threshold e (FIG. 3, the seventh line).

Step S17: Calculating the Gain a

If the maximum value max ($|\Delta X|$) is equal to or greater than the predetermined threshold "e," then the correction unit 103 calculates the gain "a" of the Sigmoid function in accordance with the following formula (FIG. 3, the eighth line).

$$a=(1+t/\text{num}(D_{tgt}))\cdot a_e/\text{max}|\Delta X| \quad (12)$$

Here, the correction unit 103 may set as appropriate a parameter ae associated with the modification processing of the transfer destination sample data set Dtgt (FIG. 3, the eighth line). In other words, the parameter ae for setting the property of the Sigmoid function used in the modification processing can be set. By modifying the property of the Sigmoid function, it is made possible to adjust the speed of the modification processing (learning processing). It should be noted that this parameter may be set as appropriate.

Step S18: Calculating Deviation of the Joint Value

Subsequently, if the joint value included in the transfer destination sample data set Dtgt corresponding to the maximum value max ($|\Delta X|$) is given as $$\vec{j}_{tgt\_m} \quad (13)$$

then the correction unit 103 calculates the deviation dj between the joint value $$\vec{j}_{tgt\_m} \quad (14)$$

and each joint value of the transfer data Dtrans $$\vec{j}_i \quad (15)$$

$$d_j=\|j_{tgt}-j_i\|^2 \quad (16)$$

In addition, by dividing each deviation by the maximum value of the calculated deviations, each deviation is normalized (FIG. 3, the ninth to eleventh lines).

$$d_j=d_j/\text{max}(d_j) \quad (17)$$

Step S19: Error Propagation

The correction unit 103 uses the Sigmoid function and propagates the error to the coordinate value included in the transfer data Dtrans in accordance with the following update formula (18) (FIG. 3, the twelfth and thirteenth lines).

$$x_i=x_i+2sgm(a,-d_j)\cdot\text{max }|\Delta X| \quad (18)$$

Step S20: Incrementing the Parameter t

After the error propagation, the correction unit 103 increments the parameter t (add 1 to t, i.e., t=t+1) (FIG. 3, the sixteenth line).

Step S21: Verifying the Number of Times of Repeated Processing

The correction unit 103 determines whether or not the parameter t is smaller than num (Dtgt).

If the parameter t is smaller than num (Dtgt), the process goes back to the step S14. As a result, the error propagation using the transfer data Dtrans updated by the error propagation is repeatedly performed (FIG. 3, the fourteenth and fifteenth lines as well as the seventh and subsequent lines).

Step S22

As the repeated processing proceeds (as the number of times of the repeated processing increases), the above-described error gradually becomes smaller, so that the maximum value of the calculated errors will also gradually become smaller. In addition, as a result of the repeated processing, the maximum value of the error becomes smaller than the threshold e, then the normalized coordinate value is restored to the original coordinate value in accordance with the following formula and the process is terminated.

$$X_{trans}=\text{max }|X_{tgt}|\cdot X_{trans} \quad (19)$$

Even if the maximum value of the error does not become smaller than the threshold e, the process is terminated to avoid divergence of the processing when the parameter t becomes equal to num (Dtgt).

In this embodiment, calculation of the joint value space is carried out prior to the calculation of the coordinate value space. This is because there may be cases where multiple joint values exist that correspond to a certain coordinate value. In such cases, when the calculation of the coordinate value space is performed, it is not possible to retrieve and identify the joint value corresponding to the coordinate value.

It should be noted herein that in the above-mentioned update formula (18), information about the joint value space is added when the coordinate value space is updated on the basis of the SOM update formula of the related art. This is because, unlike the SOM of the related art, the present invention needs to handle a plurality of spaces such as the joint value space and the coordinate value space.

In this embodiment, the action transfer device 100 modifies the data set for the transfer source robot using the transfer by SOM-algorithm, thereby generating a data set optimized for the transfer destination robot. In this modification processing, action samples that are acquired in the transfer destination robot and are less than the action samples included in the data set are used. Thus, the transfer destination robot can acquire the action of the transfer source robot in the transfer destination even if a large number of action samples are not obtained in the transfer destination robot. In other words, an equivalent action can be implemented and the action is transferred.

Further, according to this embodiment, it is made possible to implement an action transfer with an amount of calculation smaller than that in the related art. In particular, since only a smaller number of learning samples are needed in the transfer destination robot than in the related art, it is made possible to significantly reduce the amount of calculation.

<Experiments>

In order to verify the advantageous effects of the action transfer technique according to the first embodiment, the inventor conducted three types of experiments on two-degree-of-freedom, three-degree-of-freedom, and six-degree-of-freedom robots as follows.

<Experiment Using a Two-Degree-of-Freedom Robot>

Figure 4:
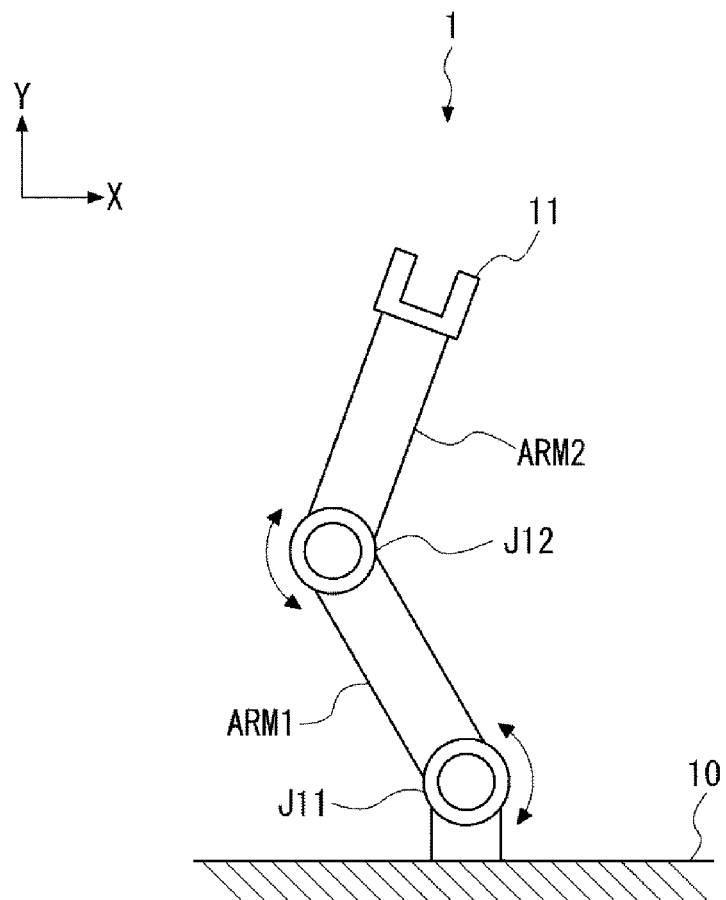
FIG. 4 is a diagram illustrating a schematic configuration of a two-degree-of-freedom robot arm.

In this experiment, a two-degree-of-freedom robot arm which operates two-dimensionally was created on a simulator. FIG. 4 is a diagram that illustrates the schematic configuration of the two-degree-of-freedom robot arm 1. The two-degree-of-freedom robot arm 1 includes a first joint J11, a second joint J12, a first arm ARM1, and a second arm ARM2. The first joint J11 and the second joint J12 are configured to be rotatable about a Z-axis perpendicular to the X-axis and the Y-axis as an axis of rotation. The holding unit 10 to hold the robot arm and the first arm ARM1 are connected to each other by the first joint J11. The first arm ARM1 and the second arm ARM2 are connected to each other by the second joint J12. The end effector 11 is attached to the tip of the second arm ARM2. In other words, the first joint J11 corresponds to a shoulder joint, the first arm ARM1 corresponds to an upper arm, the second joint J12 corresponds to an elbow joint, and the second arm ARM2 corresponds to a forearm.

Figure 5:
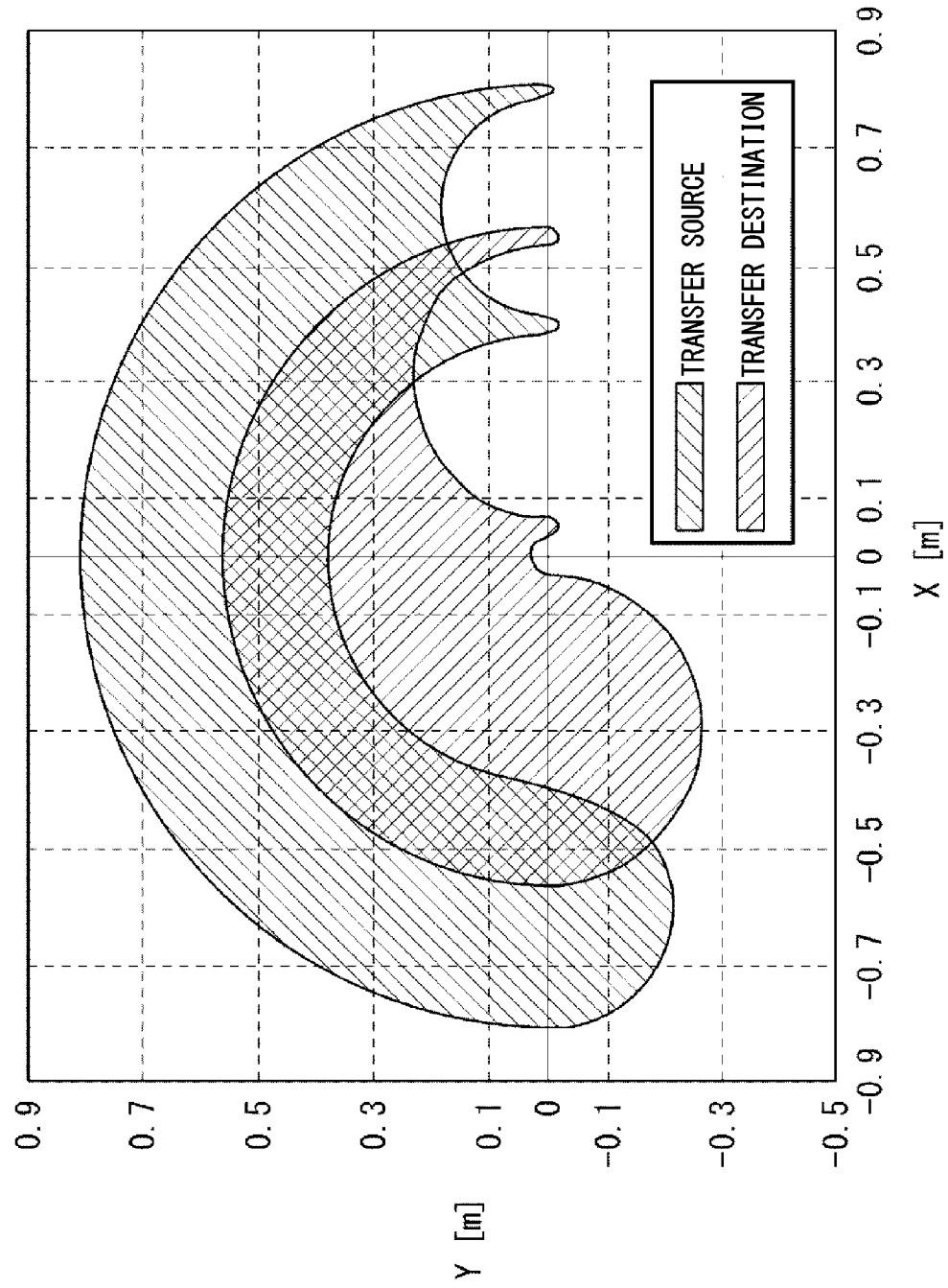
FIG. 5 is a diagram illustrating a work space in a two-dimensional plane (X-Y plane) of the two-degree-of-freedom robot arm.

In this experiment, the range of movement of the first joint J11 and the second joint J11 is limited to a range from 0° to 180°. The length of the first arm ARM1 of the transfer source robot arm is 0.300 m and the length of the second arm ARM2 of the transfer source robot arm is 0.250 m. The length of the first arm ARM1 of the transfer destination robot arm is 0.600 m and the length of the second arm ARM2 of the transfer destination robot arm is 0.200 m. FIG. 5 illustrates the work space in the two-dimensional plane of the two-degree-of-freedom robot arm (X-Y plane).

In this experiment, the transfer source data set was configured by the joint value obtained when the joints of the transfer source robot arm are moved by 1.80° and the coordinate value (the coordinate value on the X-Y plane) of the end effector at the tip of the robot arm at this point. In other words, the learning data obtained by one round of learning is of four dimensions in total including a two-dimensional joint value and a two-dimensional coordinate value. In this example, the number of pieces of data was about 10,000.

The transfer destination sample data set was configured by a joint value randomly selected from the transfer source data set and the coordinate value of the end effector of the transfer destination robot arm obtained when the selected joint value was applied to the transfer destination robot arm.

First, the relationship between the data of the transfer destination sample data set and the transfer error was investigated. In the following, the transfer error is evaluated using a root mean squared error (RMSE). The RMSE indicating the transfer error is expressed by the following formula.

$$RMSE = \frac{1}{N} \sum_{i=1}^{N} (X_{ltgt\_i} - X_{trans\_i})^2 \quad (20)$$

Here, N is the number of learning data of the transfer source data set. Xtrans is a coordinate value of the data of the transfer data set Dtrans. Xltgt is a coordinate value of the transfer destination sample data set having the same amount of the same joint values as those of the transfer source data set.

Figure 6:
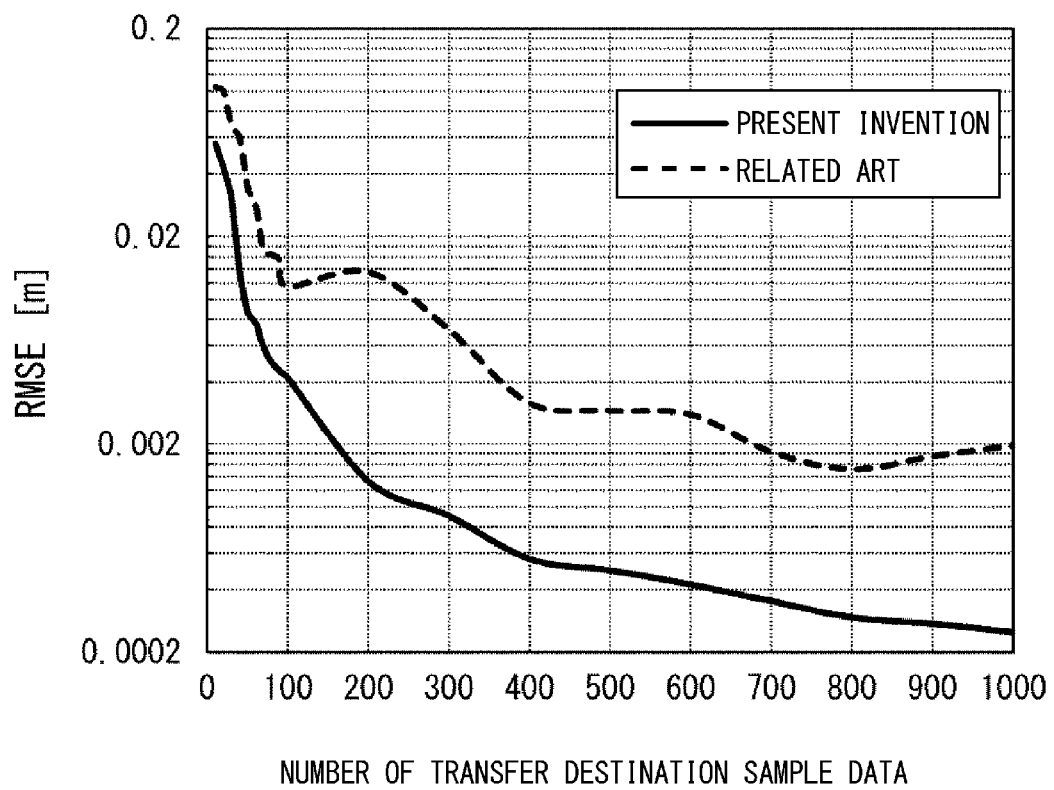
FIG. 6 is a diagram illustrating an action transfer error in the two-degree-of-freedom robot arm.

FIG. 6 illustrates an action transfer error in the two-degree-of-freedom robot arm. In this experiment, when the action transfer was not carried out, in other words, when the transfer source data set was applied on an as-is basis to the transfer destination robot arm, the transfer error (RMSE) was 0.215 (m). As illustrated in FIG. 6, it can be appreciated that the transfer error (RMSE) can be reduced as compared to a typical technique (here, the action transfer technique using LPA).

Figure 7:
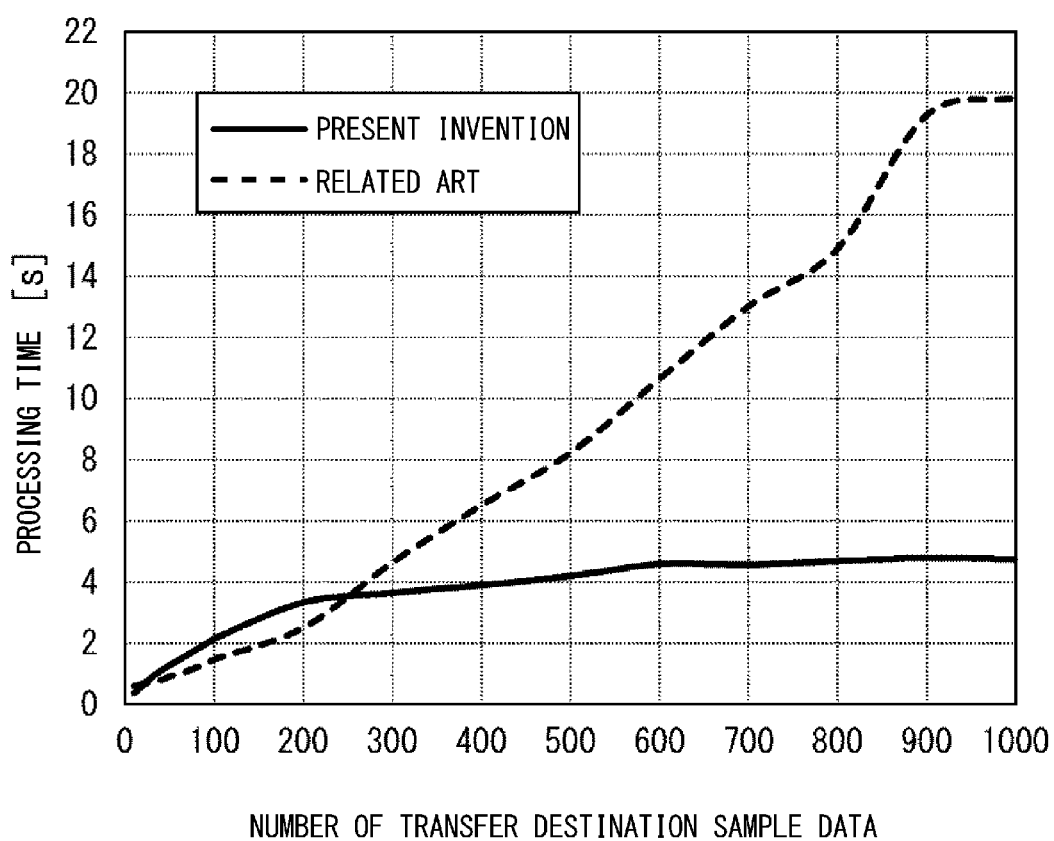
FIG. 7 is a diagram illustrating the time required in the action transfer in the two-degree-of-freedom robot arm.

Subsequently, the processing time required in the action transfer was investigated. In the following, here, the simulator was made to operate on a 3.50-GHz personal computer and the relationship between the time required to complete the action transfer and the number of pieces of data of the transfer destination sample data set was evaluated. FIG. 7 illustrates the time required for the action transfer in the two-degree-of-freedom robot arm. In a typical technique (LPA), the processing time increases generally monotonously with respect to the number of pieces of data of the transfer destination sample data set. In contrast, according to the action transfer technique in accordance with the first embodiment, the processing time saturated with about four second generally in the region where the number of pieces of data of the transfer destination sample data set is 200 or more.

As described in the foregoing, the action transfer technique according to the first embodiment, in relation to the number of pieces of data of the transfer destination sample data set, the transfer error (RMSE) is rapidly reduced and the processing time converges with the number of pieces of data of the transfer destination sample data set being about 200. In view of this, it is possible to understand that an action transfer with a sufficient accuracy was allowed to be achieved if the number of pieces of data of the transfer destination sample data set of about 200 was obtained.

Figure 8:
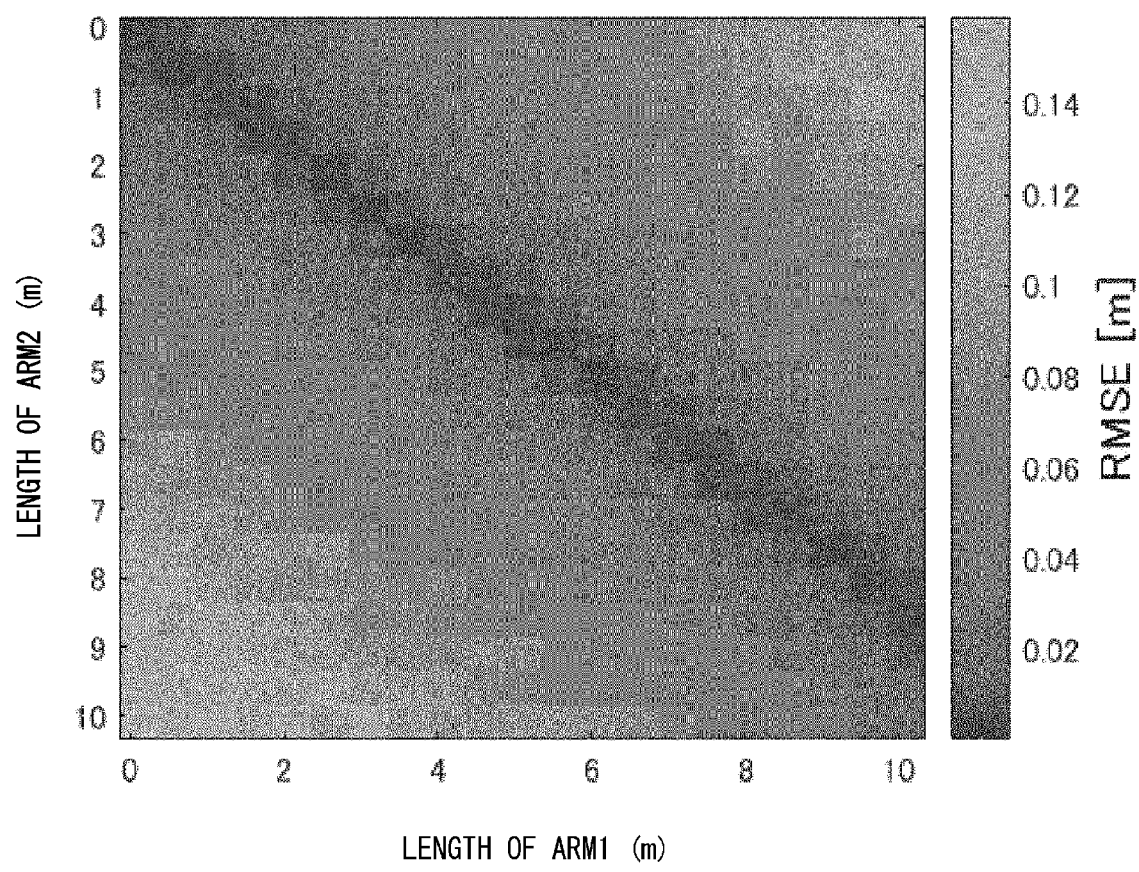
FIG. 8 is a diagram illustrating the relationship between the transfer error and the length of the arm of the transfer destination robot arm in a case where the action transfer is performed by the action transfer technique according to the first embodiment.
Figure 9:
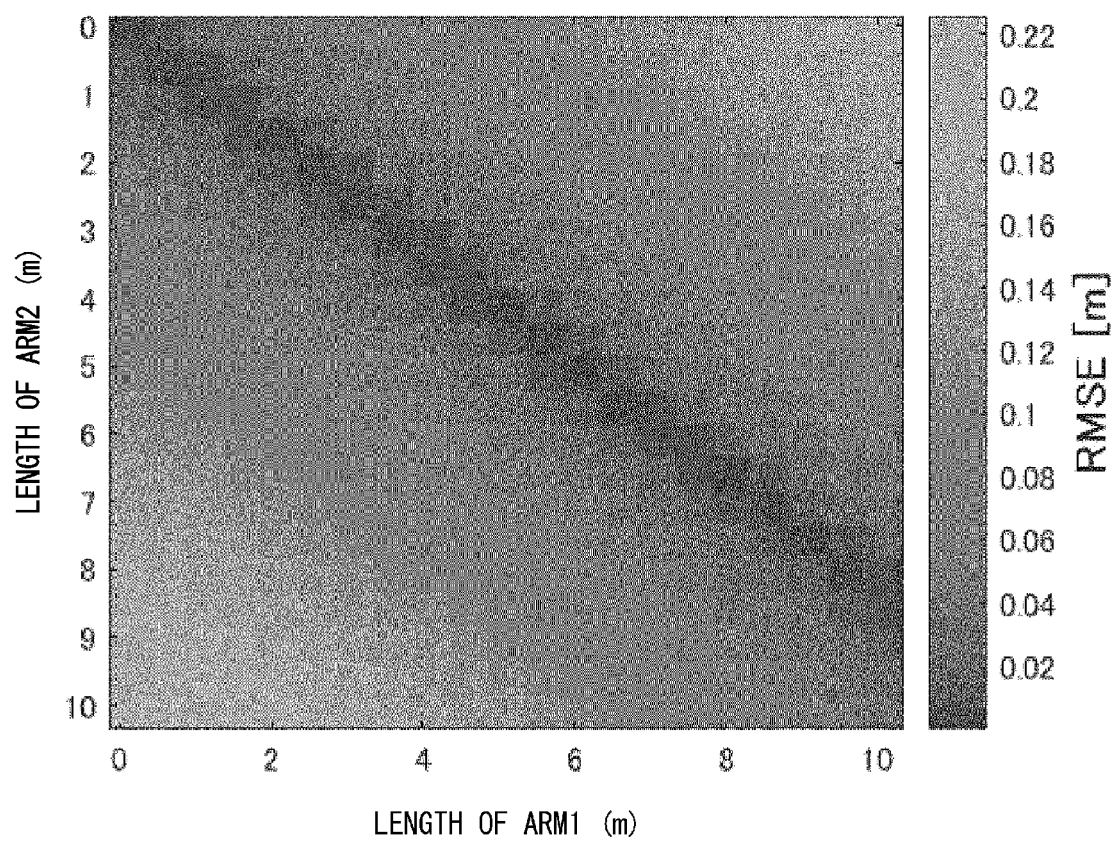
FIG. 9 is a diagram illustrating the relationship between the transfer error and the length of the arm of the transfer destination robot arm in a case where the action transfer is performed by a conventional action transfer technique. This is a diagram that illustrates a result of a comparative experiment.

Subsequently, the relationship between the length of the arm of the transfer destination robot arm and the transfer error was investigated. Here, the lengths of the two arms were changed from 0.100 (m) to 10.1 (m) with the pitch of 0.5 (m). FIG. 8 is a diagram that illustrates the relationship between the transfer error and the length of the arm of the transfer destination robot arm in the case where the action transfer was conducted by the action transfer technique according to the first embodiment. FIG. 9 is a diagram that illustrates the relationship between the transfer error and the length of the arm of the transfer destination robot arm in the case where the action transfer was performed by a conventional action transfer technique. In FIGS. 8 and 9, the horizontal axis indicates the length of one arm ARM1 of the transfer destination robot arm and the vertical axis indicates the length of the other arm ARM2 of the transfer destination robot arm. In FIGS. 8 and 9, a denser pattern indicates a smaller transfer error (RMSE).

Subsequently, the control performance of the action transfer was investigated. Here, a target location (coordinate value) in the transfer destination robot arm was randomly generated and the joint value for causing the individual arms to move toward the generated location was predicted by inverse distance weighting (IDW) using the transfer data. With regard to the IDW, details are disclosed in D. Shepard, "A two-dimensional interpolation function for irregularly-spaced data," Proceedings of the 1968 23rd ACM national conference, 1968. In addition, the individual arms were moved using the predicted joint values and the RMSE between the reached location and the target location was measured. In this example, evaluation of a total of 200 steps was conducted.

Figure 10:
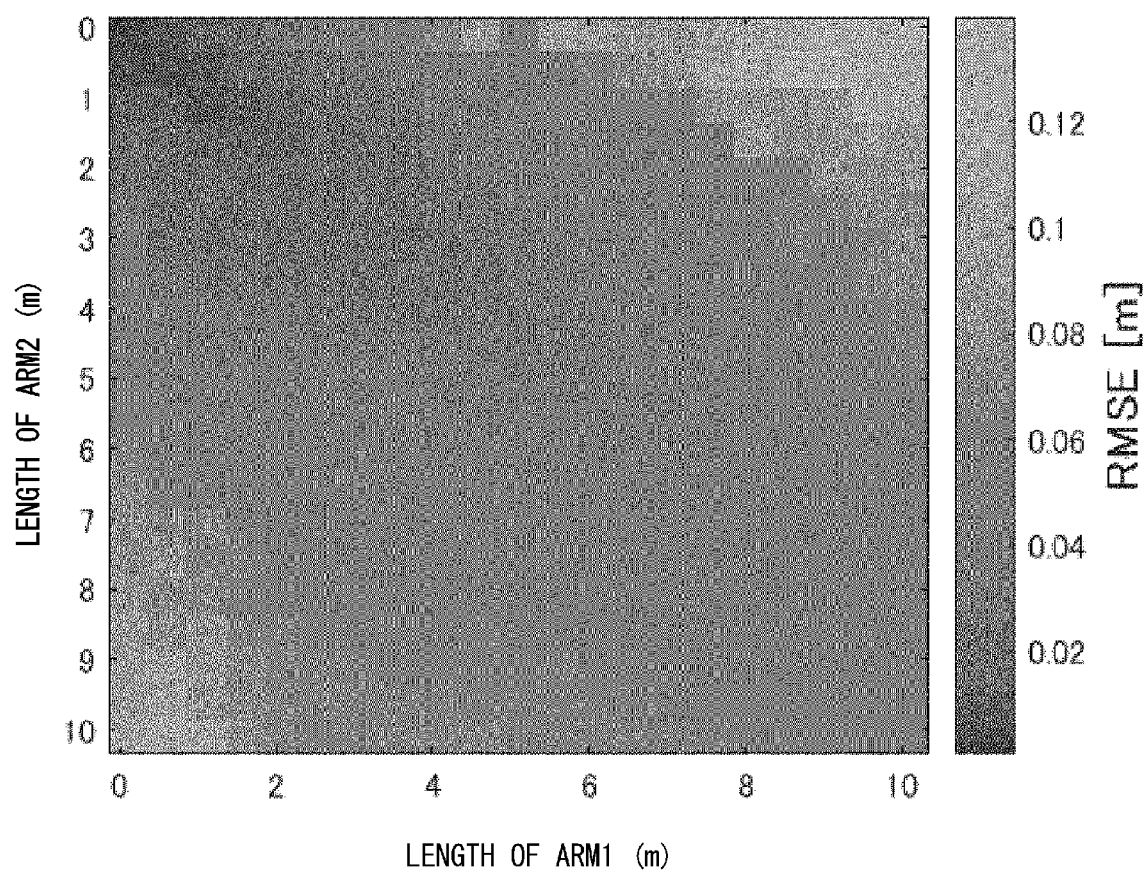
FIG. 10 is a diagram illustrating control performance in a case where transfer data generated by the action transfer technique according to the first embodiment is used.
Figure 11:
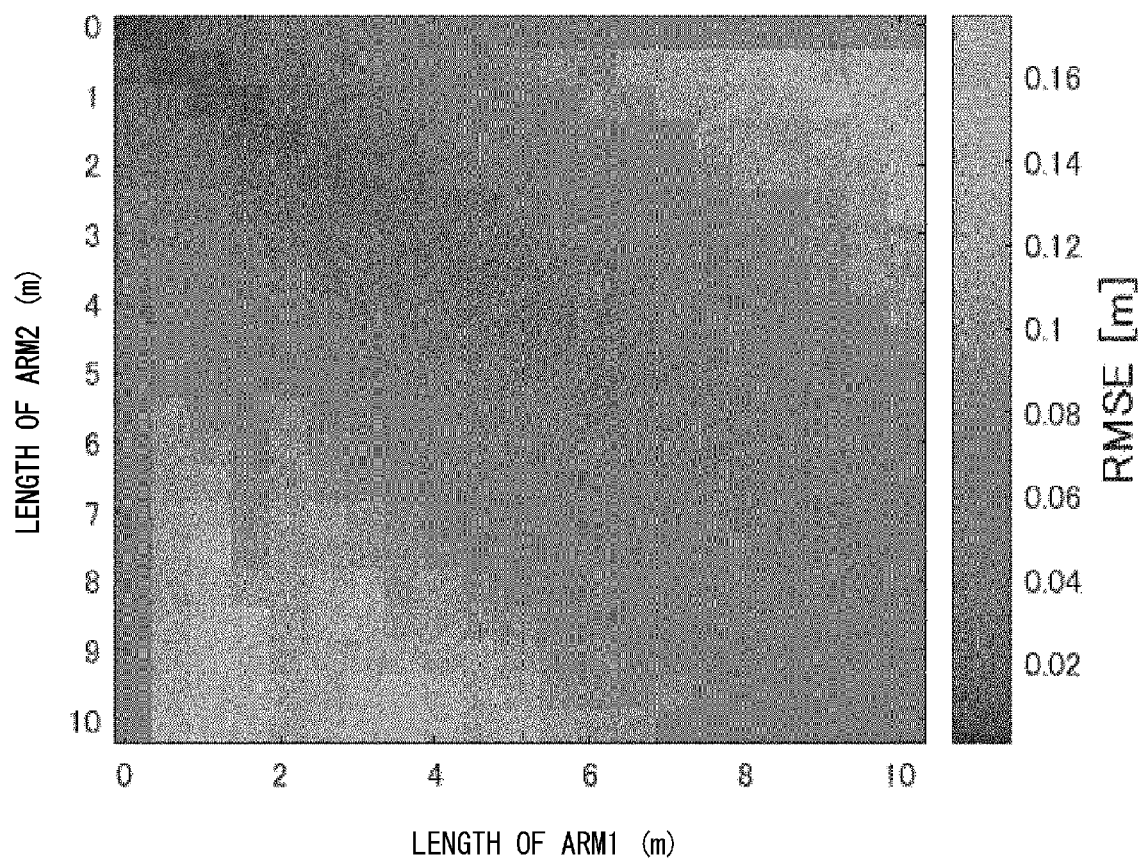
FIG. 11 is a diagram illustrating control performance in a case where transfer data generated by a conventional action transfer technique is used.

FIG. 10 is a diagram that illustrates the control performance in the case where the transfer data generated by the action transfer technique according to the first embodiment is used. FIG. 11 is a diagram that illustrates the control performance in the case where the transfer data generated by a conventional action transfer technique is used. In FIGS. 10 and 11, the horizontal axis indicates the length of one arm ARM1 of the transfer destination robot arm and the vertical axis indicates the length of the other arm ARM2 of the transfer destination robot arm. In FIGS. 10 and 11, a denser pattern indicates a smaller RMSE. As illustrated in FIGS. 10 and 11, it can be appreciated that the RMSE is reduced and the control performance is improved according to the action transfer technique according to the first embodiment.

<Experiment Using a Three-Degree-of-Freedom Robot>

Figure 12:
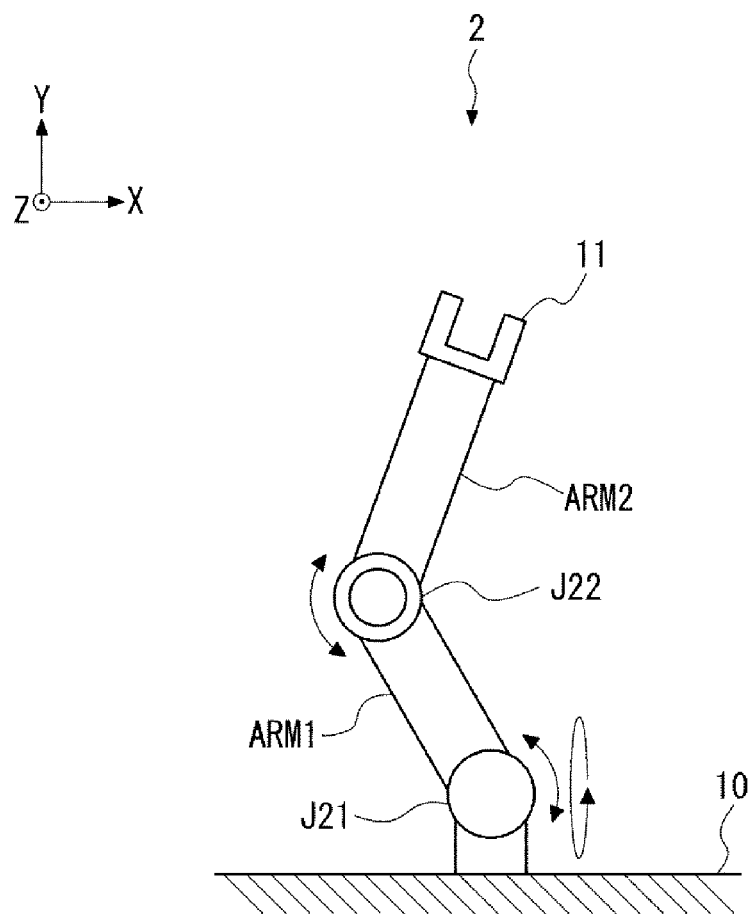
FIG. 12 is a diagram illustrating a schematic configuration of a three-degree-of-freedom robot arm.

Subsequently, a three-degree-of-freedom robot arm that operates three-dimensionally was created on a simulator to conduct a further experiment. FIG. 12 is a diagram that illustrates a schematic configuration of the three-degree-of-freedom robot arm 2. The three-degree-of-freedom robot arm 2 includes a first joint J21, a second joint J22, a first arm ARM1, and a second arm ARM2. The first joint J21 is a two-degree-of-freedom joint, and the second joint J22 is a single-degree-of-freedom joint. The holding unit 10 to hold the robot arm and the first arm ARM1 are connected to each other by the first joint J21. The first arm ARM1 and the second arm ARM2 are connected to each other by the second joint J22. The end effector 11 is attached to the tip of the second arm ARM2. In other words, the first joint J21 corresponds to a shoulder joint, the first arm ARM1 corresponds to an upper arm, the second joint J22 corresponds to an elbow joint, and the second arm ARM2 corresponds to a forearm.

In this experiment, the length of the first arm ARM1 of the transfer source robot arm is 0.300 m and the length of the second arm ARM2 of the transfer source robot arm is 0.250 m. The length of the first arm ARM1 of the transfer destination robot arm is 0.600 m, and the length of the second arm ARM2 of the transfer destination robot arm is 0.200 m. Also, the movable range in the yaw direction (in the horizontal plane) of the first joint J21 is −180° to 180°, and the movable range in the pitch direction (in the vertical plane) is 0° to 180°. The movable range in the pitch direction (in the vertical plane) of the second joint J22 is 0° to 180°.

In this experiment, the transfer source data set was configured by a joint value obtained when the joints of the transfer source robot arm were randomly moved and a coordinate value (a coordinate value in the X-Y plane) of the end effector at the tip of the robot arm at this point. In other words, the learning data obtained by one round of learning is of a total of six dimensions including a three-dimensional joint value and a three-dimensional coordinate value. In this example, the number of pieces of data was about 100,000.

The transfer destination sample data set was configured by a joint value randomly selected from the transfer source data set and the coordinate value of the end effector of the transfer destination robot arm obtained when the selected joint value was applied to the transfer destination robot arm.

Figure 13:
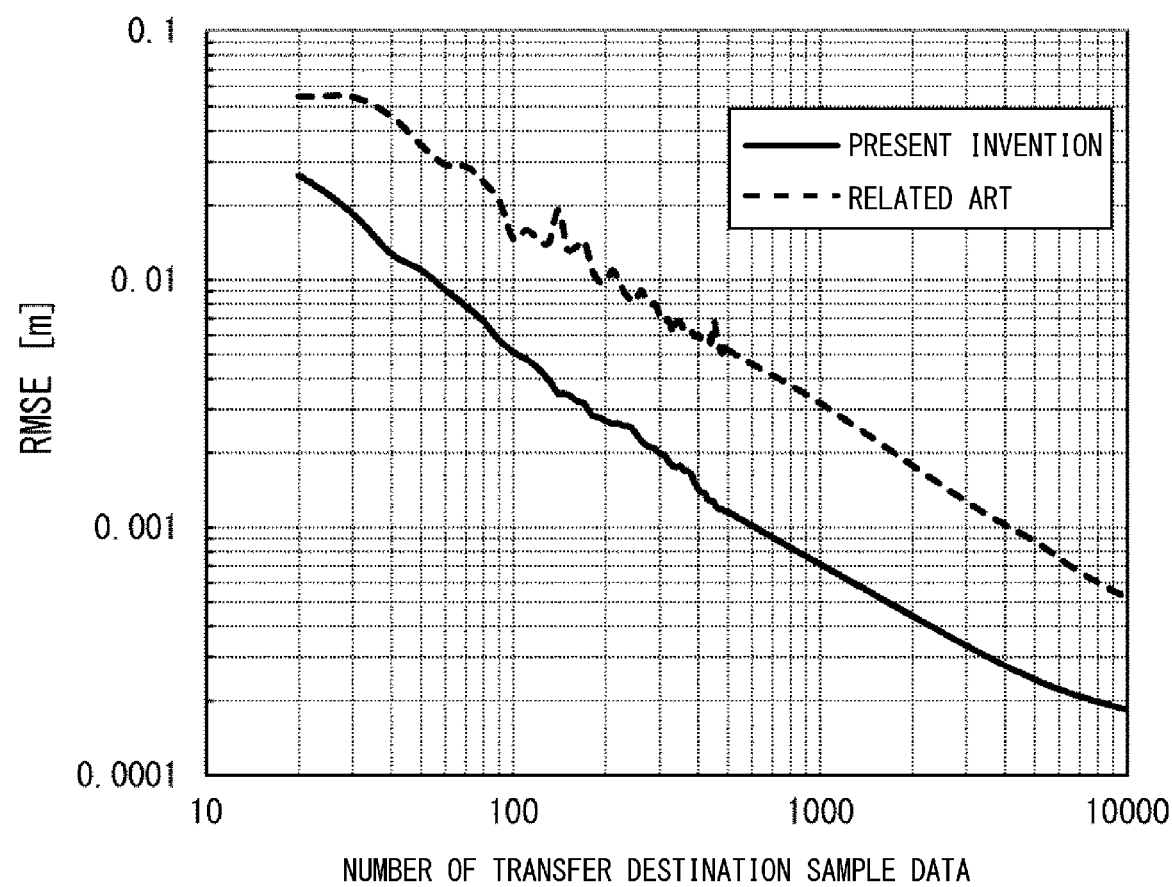
FIG. 13 is a diagram illustrating a transfer error in the three-degree-of-freedom robot arm.

First, the relationship between the data of the transfer destination sample data set and the transfer error was investigated. FIG. 13 illustrates a transfer error in the three-degree-of-freedom robot arm. In this experiment, when the action transfer was not carried out, in other words, when the transfer source data set was applied on an as-is basis to the transfer destination robot arm, the transfer error (RMSE) was 0.156 (m). As illustrated in FIG. 13, it can be appreciated that the transfer error (RMSE) can be reduced as compared to a typical technique (here, an action transfer technique using LPA).

Figure 14:
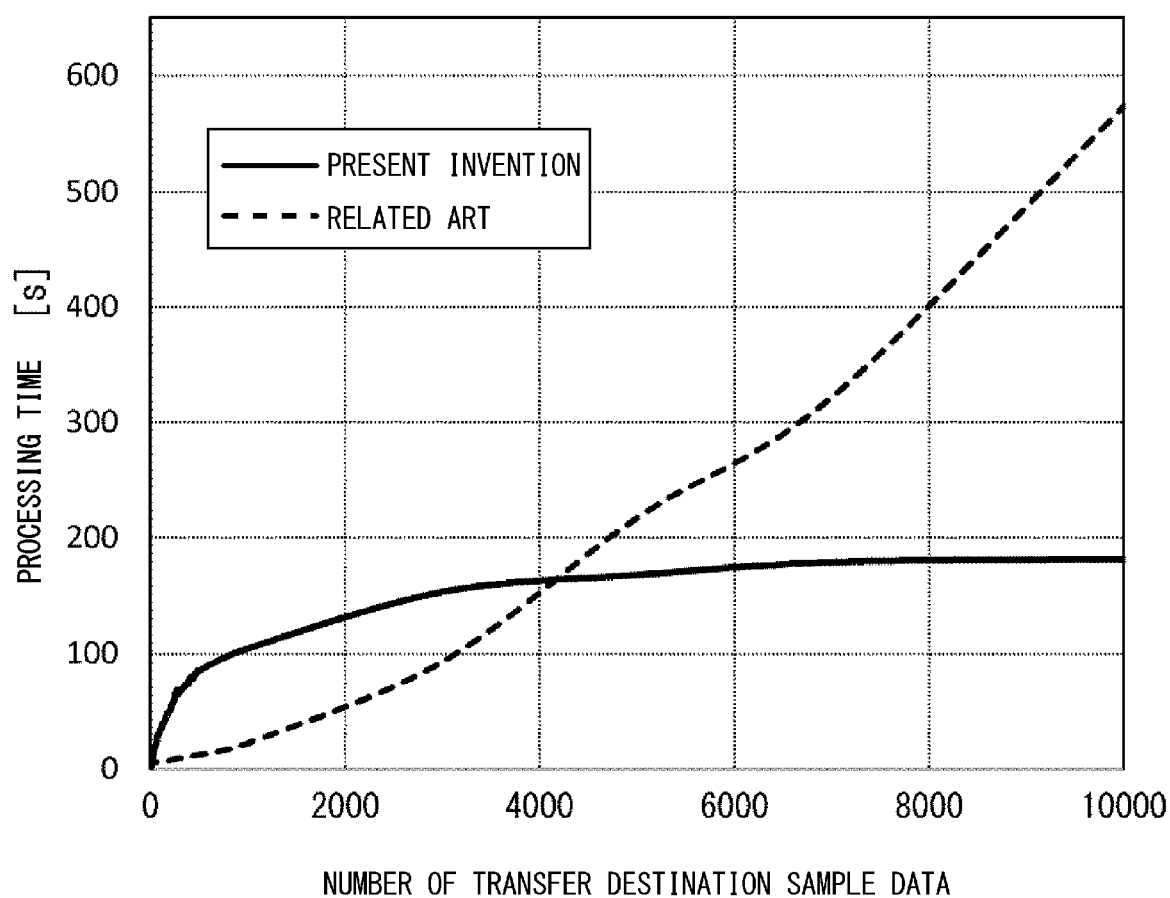
FIG. 14 is a diagram illustrating the time required in the action transfer in the three-degree-of-freedom robot arm.

Subsequently, the processing time required in the action transfer was investigated. FIG. 14 illustrates the time required in the action transfer on the three-degree-of-freedom robot arm. In this example, it has been revealed that the processing time in the action transfer technique in accordance with the first embodiment becomes longer than that in the typical technique (LPA) until the number of pieces of data reaches 5,000. This is thought to have been caused by the increase in the number of dimensions of the implementation of data which led to increase in the processing load. However, when the number of pieces of data is in the order of 5,000, a sufficient number of pieces of data was obtained and as a result of which the processing time is thought to have converged.

Figure 15:
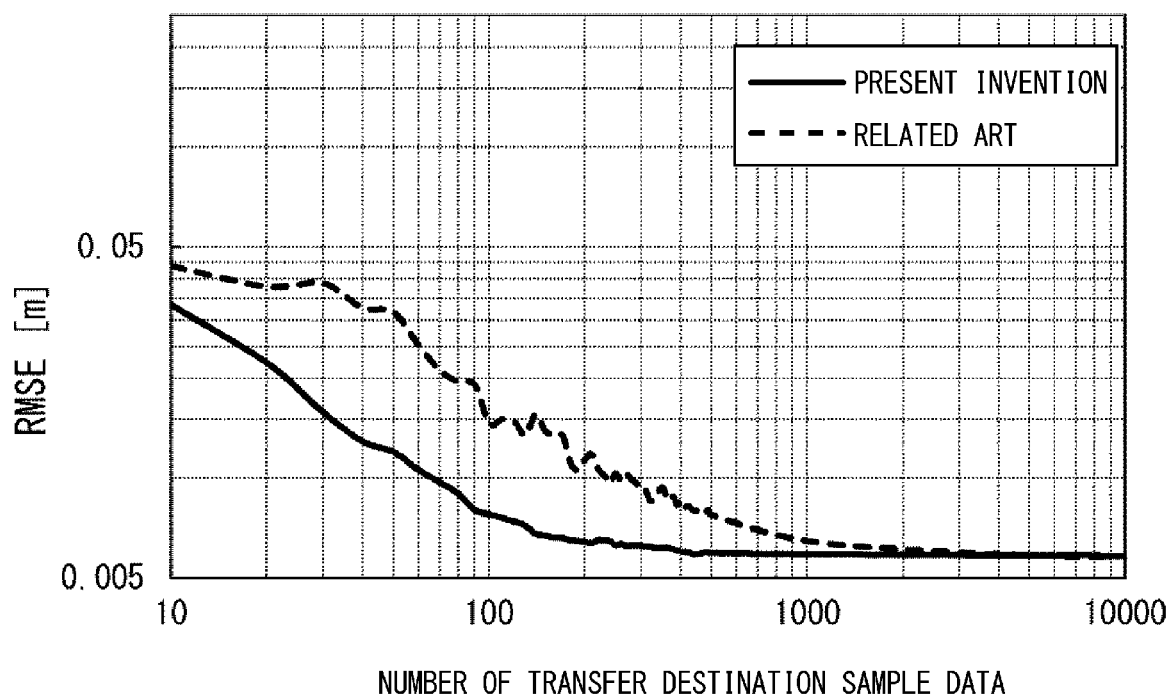
FIG. 15 is a diagram illustrating control performance of the three-degree-of-freedom robot arm.

Subsequently, in the same manner as in the case of the two-degree-of-freedom robot arm, the control performance of the action transfer was investigated. In this example, evaluation of a total of 200 steps was conducted. FIG. 15 illustrates the control performance of a three-degree-of-freedom robot arm. As illustrated in FIG. 15, before the number of pieces of data reaches 500, the technique according to the first embodiment exhibited good control performance but, when the number of pieces of data reaches 5,000, the LPA and the technique according to the first embodiment exhibited substantially the same control performance.

<Experiment Using Six-Degree-of-Freedom Robot>

Figure 16:
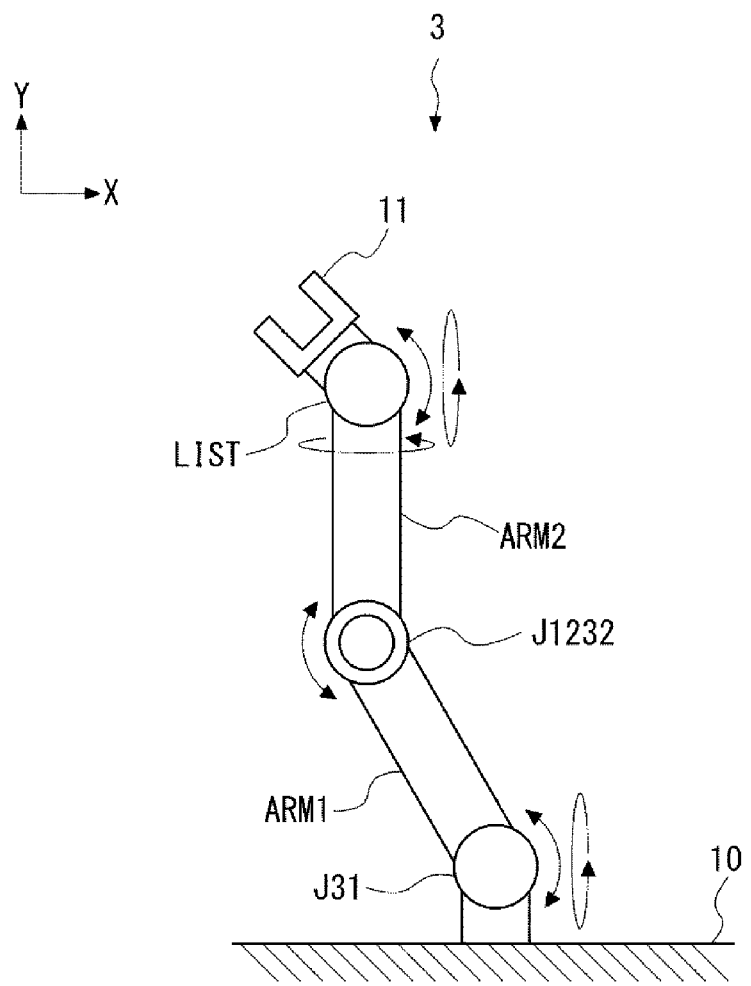
FIG. 16 is a diagram illustrating a schematic configuration of a six-degree-of-freedom robot arm.

Subsequently, a six-degree-of-freedom robot arm that operates three-dimensionally was created on a simulator to conduct further experiment. FIG. 16 is a diagram that illustrates a schematic configuration of the six-degree-of-freedom robot arm 2. The six-degree-of-freedom robot arm 2 includes a first joint J31, a second joint J32, a first arm ARM1, a second arm ARM2, and a wrist unit LIST. The first joint J31 is a two-degree-of-freedom joint, and the second joint J32 is a single-degree-of-freedom joint. The degree of freedom of the wrist unit LIST is 3 and the wrist unit LIST is configured as a typical universal joint. The holding unit 10 to hold the robot arm and the first arm ARM1 are connected to each other by the first joint J31. The first arm ARM1 and the second arm ARM2 are connected to each other by the second joint J32. The tip of the second arm ARM2 is connected by the wrist unit LIST to the end effector 11. In other words, the first joint J21 corresponds to a shoulder joint, the first arm ARM1 corresponds to an upper arm, the second joint J22 corresponds to an elbow joint, and the second arm ARM2 corresponds to a forearm.

In this experiment, the length of the first arm ARM1 of the transfer source robot arm is 0.300 m, the length of the second arm ARM2 of the transfer source robot arm is 0.250 m, and the length of the wrist unit LIST of the transfer source robot arm is 0.15 m. The length of the first arm ARM1 of the transfer destination robot arm is 0.600 m, the length of the second arm ARM2 of the transfer destination robot arm is 0.200 m, and the length of the wrist unit LIST of the transfer destination robot arm is 0.09 m. The movable range in the yaw direction (in the horizontal plane) of the first joint J31 is −85° to 85°, and the movable range in the pitch direction (in the vertical plane) is −175° to 115°. The movable range in the pitch direction (in the vertical plane) of the second joint J32 is −155° to 0°. The movable range in the roll direction of the wrist unit LIST is −125° to 125°, the movable range in the pitch direction is −95° to 95°, and the movable range in the yaw direction is −130° to 190°.

In this experiment, the transfer source data set was configured by a joint value obtained when the joints of the transfer source robot arm were randomly moved and a coordinate value (a coordinate value in the X-Y plane) of the end effector at the tip of the robot arm at this time. In other words, the learning data obtained by one round of learning is nine dimensions in total including six-dimensional joint value and three-dimensional coordinate value. In this example, the number of pieces of data was 500,000.

The transfer destination sample data set was configured by a joint value randomly selected from the transfer source data set and the coordinate value of the end effector of the transfer destination robot arm obtained when the selected joint value was applied to the transfer destination robot arm.

Figure 17:
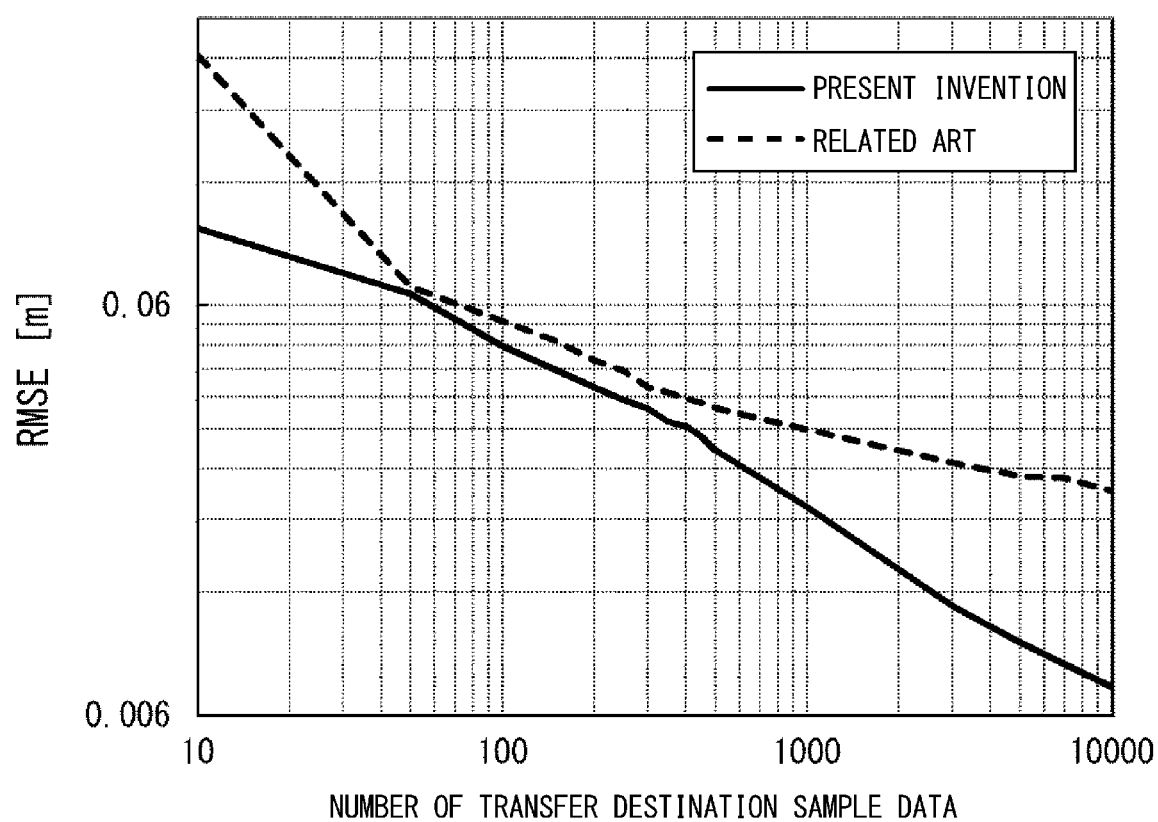
FIG. 17 is a diagram illustrating a transfer error in the six-degree-of-freedom robot arm.

First, the relationship between the data of the transfer destination sample data set and the transfer error was investigated. FIG. 17 illustrates a transfer error in a six-degree-of-freedom robot arm. Five rounds of action transfer were carried out to make an evaluation using the average value of these transfer errors. In this experiment, when the action transfer was not carried out, in other words, when the transfer source data set is applied on an as-is basis to the transfer destination robot arm, the transfer error (RMSE) was 0.206 (m). As illustrated in FIG. 17, it can be appreciated that the transfer error (RMSE) can be reduced as compared to a typical technique (here an action transfer technique using LPA). Also, in the case of the number of pieces of data of the transfer destination sample data set, the unit error increased in LPA while the unit error did not increase in the action transfer technique according to the first embodiment and the transfer error was allowed to be reduced to about a half of the original error.

Figure 18:
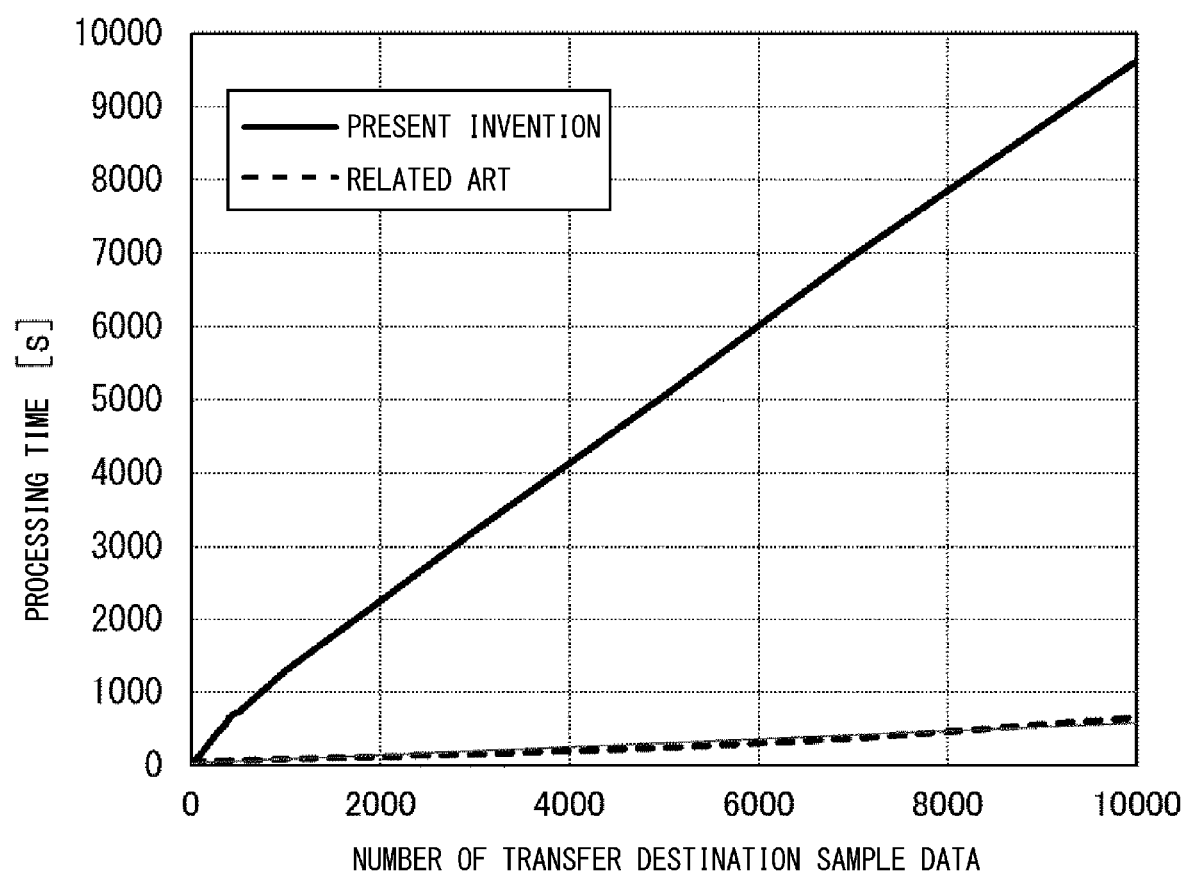
FIG. 18 is a diagram illustrating the time required in the action transfer in the six-degree-of-freedom robot arm.

Subsequently, the processing time required in the action transfer was investigated. FIG. 18 illustrates the time required in the action transfer on the six-degree-of-freedom robot arm. In this example, the processing time in the action transfer technique according to the first embodiment becomes longer than that in the typical technique (LPA). This is thought to have been caused by the further increase in the number of dimensions of the implementation of data which led to the further increase in the processing load.

Figure 19:
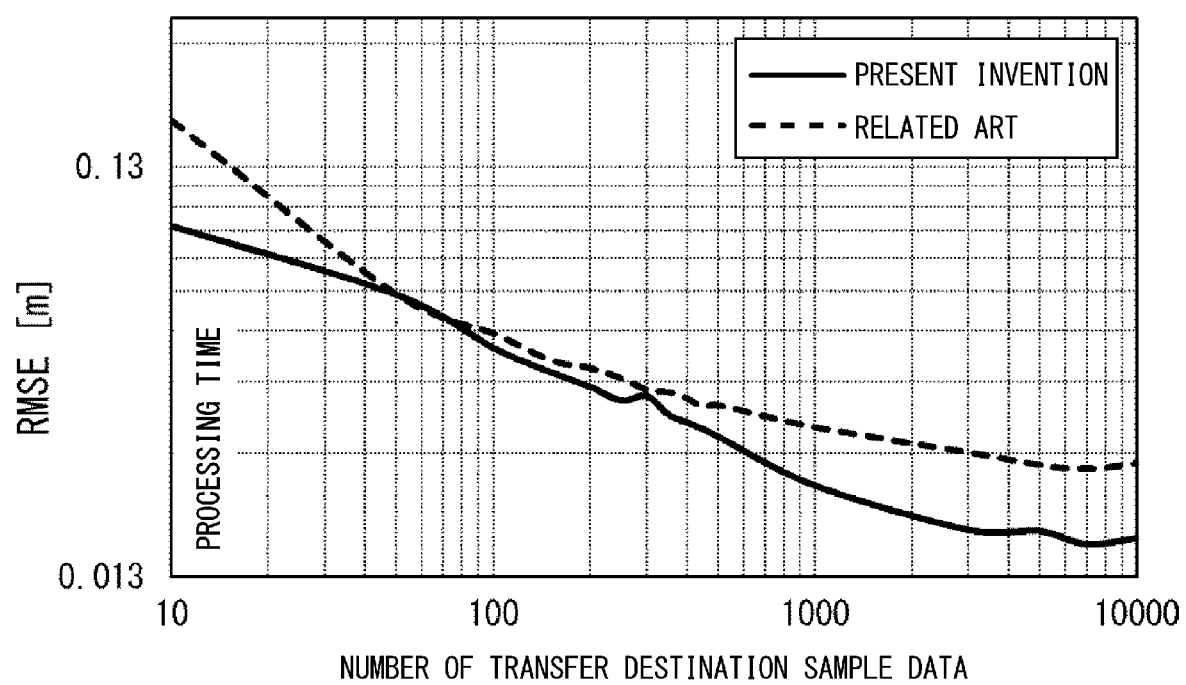
FIG. 19 is a diagram illustrating control performance of the six-degree-of-freedom robot arm.

Subsequently, in the same manner as in the case of the two-degree-of-freedom robot arm, the control performance of the action transfer was investigated. In this example, the evaluation of a total of 200 steps was conducted. FIG. 19 illustrates the control performance of a six-degree-of-freedom robot arm. As illustrated in FIG. 19, regardless of the number of pieces of data, the technique according to the first embodiment exhibited good control performance.

<Other Embodiments>

It should be noted that the present invention is not limited to the embodiments described above and can be modified as appropriate without departing from the scope of the invention. For example, in the above embodiments, the Sigmoid function is employed for mapping of coordinate values of the transfer source and coordinate values of the transfer destination. However, instead of the Sigmoid function, any function, such as an arc tangent (arctan), may be employed.

Further, the above embodiments disclose techniques for transferring action information on the premise that two spaces, i.e., the joint value space and the coordinate value space, are present. However, any appropriate number N of spaces may be provided. In this case, the above-described update formula can be extended as appropriate depending on the number of spaces. For example, coordinate values may be defined as the functions of joint values and coordinate values by adding a sensor value space. Sensor values may be, for example, data indicating an arm state (e.g., a folded or bent arm). This enables the robot to act in consideration of the sensor values. Thus, it is considered that actions can be selected and generated depending on the robot itself and the peripheral state of the robot.

Also, while the above embodiments have been described assuming that the present invention has a mainly hardware-based configuration, the present invention is not limited to this. Any processing can be implemented by causing a central processing unit (CPU) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as flexible disks, magnetic tapes, and hard disk drives), optical magnetic storage media (e.g., magneto-optical disks), CD-ROM (Read Only Memory), CD-R, CD-R/W, and semiconductor memory devices (such as mask ROM, PROM (Programmable ROM), EPROM (Erasable PROM), flash ROM, RAM (random access memory), etc.). In addition, the program may be provided to a computer using any type of transitory computer readable media. Examples of transitory computer readable media include electric signals, optical signals, and electromagnetic waves. Transitory computer readable media can provide the program to a computer via a wired communication line, such as an electric wire and an optical fiber, or a wireless communication line.

This application is based upon and claims the benefit of priority from Japanese Patent Application No. 2016-217353, filed on Nov. 7, 2016, the disclosure of which is incorporated herein in its entirety.

REFERENCE SIGNS LIST 1-3 ROBOT ARM
10 HOLDING UNIT
11 END EFFECTOR
100 ACTION TRANSFER DEVICE
101 TRANSFER SOURCE ACTION INFORMATION ACQUISITION UNIT
102 TRANSFER DESTINATION ACTION INFORMATION ACQUISITION UNIT
103 CORRECTION UNIT
104 OUTPUT UNIT
J11, J21, J31 FIRST JOINT
J12, J22, J32 SECOND JOINT
ARM1 FIRST ARM
ARM2 SECOND ARM
LIST WRIST UNIT

The invention claimed is:

1. An action transfer device comprising:
a transfer source action information acquisition unit configured to acquire first action information including data indicative of a plurality of actions of a transfer source robot;
a transfer destination action information acquisition unit configured to acquire second action information including data indicative of a plurality of actions of a transfer destination robot; and
a correction unit configured to correct the first action information by using the second action information and in accordance with a predetermined update formula and thereby generate third action information for transferring the actions of the transfer source robot to the transfer destination robot, a number of pieces of data included in the second action information being smaller than a number of pieces of data included in the first action information, the first to third action information including a set of data indicative of one or more robot joint values and a set of data indicative of a coordinate value of a robot specific part, the correction unit being configured to:
retrieve the same joint value as a joint value included in the second action information from among the joint values included in the first action information;
calculate an error between a coordinate value included in the first action information and corresponding to the retrieved joint value and a coordinate value included in the second action information;
select a maximum error which is a maximum value from the calculated errors of the coordinate values;
select a joint value included in the second action information and corresponding to the maximum error; and
propagate the maximum error to each of the coordinate values included in the first action information by using the update formula including as a parameter an error between the joint values each corresponding to one of the coordinate values included in the first action information and a joint value corresponding to the maximum error, and generate the third action information.

2. The action transfer device according to claim 1, wherein the correction unit is configured to repeatedly perform propagation of the error using the update formula until the maximum error becomes smaller than a preset threshold.

3. The action transfer device according to claim 1, wherein the update formula is expressed as $x=x+2\text{sgm}(a, d) \times \Delta x$, where X is the coordinate value, $\Delta x$ is the maximum error, sgm (a, d) is a Sigmoid function of a gain a and a variable d, and d is the error of the joint values that is included as the parameter in the update formula.

4. The action transfer device according to claim 3, wherein
- the coordinate value included in the first action information is a value obtained by dividing a plurality of coordinate values obtained by causing the transfer source robot to operate by a maximum value among the plurality of coordinate values, the coordinate value included in the second action information is a value obtained by dividing a plurality of coordinate values obtained by causing the transfer destination robot to operate by a maximum value among the plurality of coordinate values, and the parameter d of the update formula is a value obtained by dividing the error between the joint values each corresponding to one of the coordinate values included in the first action information and the joint value corresponding to the maximum error by a maximum value among the errors.

5. An action transfer method comprising:
- acquiring first action information including data indicative of a plurality of actions of a transfer source robot;
- acquiring second action information including data indicative of a plurality of actions of a transfer destination robot;
- correcting the first action information by using the second action information and in accordance with a predetermined update formula and thereby generating third action information for transferring the actions of the transfer source robot to the transfer destination robot, wherein a number of pieces of data included in the second action information is smaller than a number of pieces of data included in the first action information, and the first to third action information includes a set of data indicative of one or more robot joint values and a set of data indicative of a coordinate value of a robot specific part;
- retrieving the same joint value as a joint value included in the second action information from among the joint values included in the first action information;
- calculating an error between a coordinate value included in the first action information and corresponding to the retrieved joint value and a coordinate value included in the second action information;
- selecting a maximum error which is a maximum value from the calculated errors of the coordinate values;
- selecting a joint value included in the second action information and corresponding to the maximum error; and propagating the maximum error to each of the coordinate values included in the first action information by using the update formula including as a parameter an error between the joint values each corresponding to one of the coordinate values included in the first action information and a joint value corresponding to the maximum error and generating the third action information.

6. A non-transitory computer readable medium storing an action transfer program, the action transfer program causing a computer to execute:
- a process of acquiring first action information including data indicative of a plurality of actions of a transfer source robot;
- a process of acquiring second action information including data indicative of a plurality of actions of a transfer destination robot; and a process of correcting the first action information by using the second action information and in accordance with a predetermined update formula and thereby generating third action information for transferring the actions of the transfer source robot to the transfer destination robot, wherein a number of pieces of data included in the second action information is smaller than a number of pieces of data included in the first action information, and the first to third action information includes a set of data indicative of one or more robot joint values and a set of data indicative of a coordinate value of a robot specific part, and the process of generating the third action information includes:
- retrieving the same joint value as a joint value included in the second action information from among the joint values included in the first action information;
- calculating an error between a coordinate value included in the first action information and corresponding to the retrieved joint value and a coordinate value included in the second action information;
- selecting a maximum error which is a maximum value from the calculated errors of the coordinate values;
- selecting a joint value included in the second action information and corresponding to the maximum error; and propagating the maximum error to each of the coordinate values included in the first action information by using the update formula including as a parameter an error between the joint values each corresponding to one of the coordinate values included in the first action information and a joint value corresponding to the maximum error and generating the third action information.

* * * * *